United States Patent [19]

Brahm et al.

[11] Patent Number: 4,713,834
[45] Date of Patent: Dec. 15, 1987

[54] MULTIPROCESSOR COMPUTING SYSTEM FEATURING SHARED GLOBAL CONTROL

[75] Inventors: David J. Brahm, Naperville; James M. Grinn, Warrenville; Edward L. Hepler; Edward P. Schan, Jr., both of Woodridge, all of Ill.

[73] Assignee: American Telephone and Telegraph Company, AT&T Bell Laboratories, Murray Hill, N.J.

[21] Appl. No.: 876,407

[22] Filed: Jun. 20, 1986

Related U.S. Application Data

[62] Division of Ser. No. 430,681, Sep. 30, 1982, Pat. No. 4,626,634.

[51] Int. Cl.$^4$ ............................................. H04M 3/28
[52] U.S. Cl. ..................................................... 379/28
[58] Field of Search ................. 364/200, 900; 379/28, 379/94, 95, 96; 179/18 ES, 18 DP

[56] References Cited

U.S. PATENT DOCUMENTS

| | | | |
|---|---|---|---|
| 3,710,324 | 1/1973 | Cohen et al. | 364/200 |
| 4,205,373 | 5/1980 | Shah et al. | 364/200 |
| 4,253,144 | 2/1981 | Bellamy et al. | 364/200 |
| 4,276,594 | 6/1981 | Morley | 364/200 |
| 4,308,581 | 12/1981 | Raghunathan | 364/200 |
| 4,315,310 | 2/1982 | Bayliss et al. | 364/200 |
| 4,322,792 | 3/1982 | Baun | 364/200 |

FOREIGN PATENT DOCUMENTS 354783  1/1980  Austria .

OTHER PUBLICATIONS

K. Marton et al., "Memory Addressing Scheme for Loosely Coupled Processors", *IBM Technical Disclosure Bulletin*, vol. 22, No. 7, Dec. 1979, pp. 2883-2884.
J. Thomas, "Shared Memory Addressing System", *IBM Technical Disclosure Bulletin*, vol. 7, No. 5, Oct. 1964, pp. 352-353.
W. S. Ang, "Common Element Key to Multiprocessor Architecture", *Computer Design*, vol. 20, No. 10, Oct. 1981, pp. 179-184.
H. M. Slesinger and R. H. Rosenbaum, "Microprocessor-Based Synchronous Communications Subsystem for Minicomputers", *Proceedings of the Fourth International Conference on Computer Communication*, pp. 77-81, (Kyoto, Japan, 26-29 Sep. 1978).
A. A. Allison, "Status Report on the P896 Backplane Bus", *IEEE Micro*, pp. 67-82, (Feb. 1981).
*PDP*11 *Peripherals Handbook*, Ch. 5, (Digital Equipment Corporation, 1975).

*Primary Examiner*—Gareth D. Shaw
*Assistant Examiner*—John G. Mills
*Attorney, Agent, or Firm*—David Volejnicek

[57] ABSTRACT

A multiprocessor system comprises a plurality of stations interconnected by a system communication bus and cooperating in the performance of system tasks. Each station includes a plurality of addressable elements interconnected by a station communication bus. All stations are mapped into a common address space, with the elements of each station mapped onto like relative addresses in two subspaces of the address space: a subspace which is shared in common by all stations, and a subspace dedicated to the station whose addresses are the common subspace addresses in combination with a station-identifying address portion. The stations are symmetrical: like elements in all of the stations are mapped onto like relative addresses in their associated subspaces. Addressing within the system is self-referential: a station accesses one of its addressable elements by placing its common subspace address on the station communication bus. Each station's station bus is selectively interfaced to the system bus, and a station accesses an addressable element of another station by placing its dedicated subspace address on the station bus, interfacing its station bus with the system bus, and causing the other station to interface its station bus with the system bus. A station accesses an element of another station passively, without utilizing the intelligence, if any, of the other station to make the access.

17 Claims, 21 Drawing Figures

LB 21 READ PROTOCOL

LB 21 WRITE PROTOCOL

MICRO BUS 36 READ PROTOCOL

MICRO BUS 36 WRITE PROTOCOL

FIG. 17 MBC STATE MACHINE

LB MASTER STATE MACHINE

LB SLAVE STATE MACHINE

MULTIPROCESSOR COMPUTING SYSTEM FEATURING SHARED GLOBAL CONTROL

CROSS-REFERENCE TO RELATED APPLICATIONS

This is a division of application Ser. No. 430,681, filed Sept. 30, 1982, and issued as U.S. Pat. No. 4,626,634.

Concurrently filed herewith is a second division of application Ser. No. 430,681, identified as D. J. Brahm, J. M. Grinn, E. L. Hepler, and J. M. Sullivan, entitled "Multiprocessor Computing System Featuring Shared Global Control", Ser. No. 876,409.

Concurrently filed with the parent application and assigned to the same assignees as this application is:
application of D. J. Brahm, J. M. Grinn, E. L. Hepler, and J. M. Sullivan, entitled "Deadlock Detection and Resolution Scheme", Ser. No. 430,396, now U.S. Pat. No. 4,494,193.

TECHNICAL FIELD

This invention relates to multiprocessor computing systems.

BACKGROUND OF THE INVENTION

A multiprocessor computing system is a computer assembled from a plurality of independently or semi-independently operating intelligent, i.e., processor-based, stations which are generally interconnected for communication by a communication bus. The system may also include other stations which are passive, i.e., which lack a processor to provide them with intelligence but which operate under the direction of, as extensions of, one or more of the intelligent stations. The stations are configured to practice a division of labor; that is, while they commonly are functionally diverse, with each station dedicated to the performance of predetermined functions, they cooperate in the performance of system tasks.

The objective of distributing the system intelligence among a plurality of stations is to improve the processing throughput of the computing system and to make the system versatile, flexible, to permit different systems adapted for different applications to be assembled from substantially the same repertoire of stations serving as building blocks of the system, and to allow the system to modularly and uniformly expand to meet increasing computing requirements.

While multiprocessor computing systems are known to the art, they have not achieved the full spectrum and ease of flexibility that it desirable, due to the complexities that such capability has been thought to introduce into both the system hardware design, and into the design of software capable of operating on such hardware and capable of taking advantage of the full range of features offered by such hardware. The software of such systems has been highly dependent upon the particular configuration and characteristics of the system hardware. Therefore a change in the system hardware or a change in the hardware configuration has required changes in the system software that reflect the hardware changes. Furthermore, the extension of uniprocessor capabilities and functional features to the multiprocessor system environment has greatly complicated the hardware needed to implement such features and capabilities in the system. Therefore, the multiprocessor computing systems of the prior art have sacrificed system flexibility and have imposed restrictions on system capabilities for the sake of achieving lesser complexity in system hardware.

The result has been that the prior art multiprocessor systems have been unduly restrictive in flexibility of operation and configuration which they support. Yet, at the same time, they have been relatively complex, especially in their software requirements. Because of those complexities and idiosyncrasies of the prior art multiprocessor systems, personnel such as system administrators and programmers who are highly trained in, a knowledgeable of, the protocols and internal structure of each system have been needed to maintain and configure the systems, resulting in high costs.

An example of such a prior art system as is described above is a multiprocessor system comprised of a plurality of processor stations interfaced for communication by a known bus which provides system configurational flexibility via a multimaster capability, that is, more than one intelligent station included in the system is allowed to initiate communications on the bus and to request action from other stations in the system. Such bus may be, for example, the UNIBUS ® bus. The multiprocessor system limits direct access by one station of a second station of the system to an interface portion of the second station. Access by the first station's intelligence of the internals of the second station involves the intelligence of the second station in the completion of the communication, and requires the use of an additional layer of software communication protocol. All this makes the software of the multiprocessor system complex and makes station-to-station accesses visible to the software. Primarily because of the involvement of software in station-to-station accesses, expansion or reconfiguration of the system requires the services of a trained system administrator who is highly knowledgeable of all aspects of the operation and configuration of the systems so that he is capable of rearranging and modifying all affected system hardware and software in order to make the reconfigured system functional.

SUMMARY OF THE INVENTION

It is these and other disadvantages of the prior art multiprocessor systems that this invention is directed to alleviate.

According to this invention, in a multiprocessor system comprising a plurality of stations interconnected by a system communication medium, a station has a first plurality and a second plurality of addresses associated therewith. The addresses of the first plurality of addresses of the station are exclusive to that station and the addresses of the second plurality of addresses are common to the stations. Preferably the first plurality of addresses of the station includes the addresses of the second plurality of addresses each combined with an address portion identifying the associated station. The station includes a plurality of addressable elements and a station communication medium which interconnects the plurality of elements. An element has a first address from the first plurality of address and a second address from the second plurality of addresses associated therewith. The plurality of elements of the station include a plurality of common elements each of which has a functional counterpart common element in at least one other station, and the common elements of the stations have the same second address associated with them.

At least two of the stations in the system each include element accessing means for selectively generating the system address of an element of another station on the system medium and for selectively generating the second address of an element of the associated station on the station medium. Each station in the system includes interface means for connecting the system medium with the station medium in response to detecting an address from the first plurality of addresses of the associated station on the system medium.

Advantageously, each of the at least two stations also includes means for preventing the element accessing means of the associated station from accessing elements in response to detecting an address from the first plurality of addresses of the associated station on the system medium.

A multiprocessor computing system constructed according to this invention provides improved flexibility in the configuration of system hardware and in ease of system expansion without sacrificing system capabilities and functional features. The invention provides a highly reliable system architecture. System access by maintenance tools, diagnostic tools, and debugging tools is provided for. The inventive system is highly diagnosable, providing for self-diagnosis by intelligent stations and for the initiation of system diagnostics from any intelligent station in the system. Likewise, system control, including bootstrap loading, reset, and interrupt may be exercised from any intelligent station in the system. The system allows any intelligent station in the system to access any addressable element of any other station in the system in a passive manner, that is, without involvement of the intelligence of the accessed station. Interlocked access of any addressable element in the system may therefore be performed by any intelligent station in the system. The invention provides a system hardware architecture which is flexible enough to support a whole family of multiprocessor computing systems, without limiting the flexibility of operation or configuration of the future systems by the current implementation.

Yet the invention provides the above-mentioned features without complicating or placing restrictions on system software. The hardware configuration of the system is globally consistent from the viewpoint of the system software. The software is enabled to take full advantage of the flexibility and features provided by the system hardware without being complicated thereby as a result of having to take peculiarities of the hardware configuration into consideration. The software can reach any addressable element in the system without having to enforce any special communication protocol with the station that includes the element. The software need not even be aware of whether it is communicating with an intelligent or a passive station. The communication protocol for all stations in the system is the same.

The system according to this invention is self-configuring. Reconfiguration or expansion of the system merely requires the connecting onto or disconnecting from the communication medium of the multiprocessor system of a station having the desired functionality, with no need for a highly skilled system administrator to modify the software of the system in order to reconfigure the system.

These and other features and advantages the present invention will become more apparent from the following description of an illustrative embodiment of the invention taken together with the drawing.

DETAILED DESCRIPTION

Figure 1:
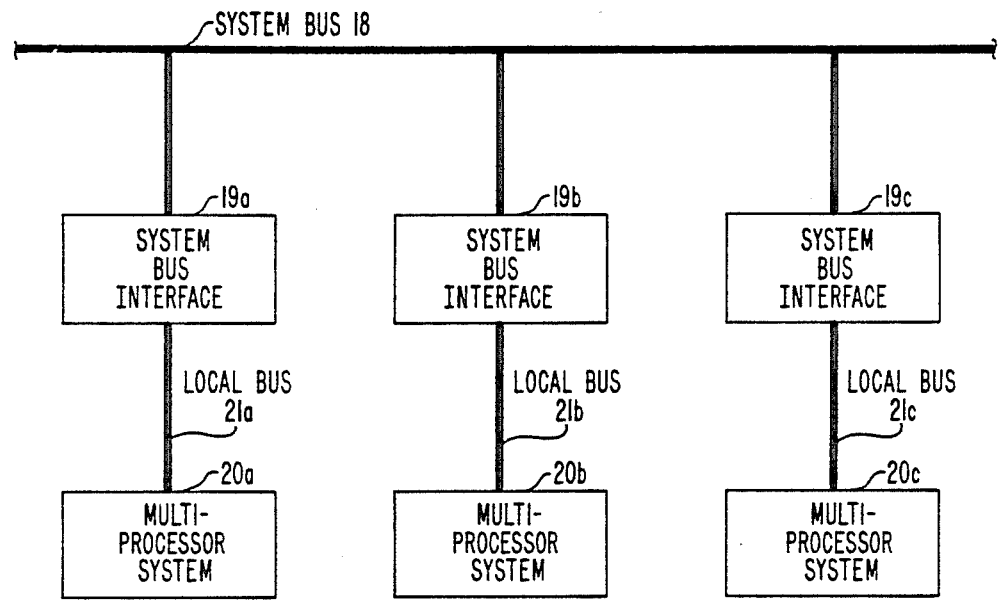
FIG. 1 is a block diagram of a multicomputer system.

Turning now to the drawing, FIG. 1. shows an illustrative multicomputer system 17. As the name indicates, the multicomputer system 17 is comprised of a plurality of computer systems, in this example of plurality of multiprocessor systems 20. For purposes of illustration, three multiprocessor systems 20a–c are shown. The multiprocessor systems 20 are interconnected by a system bus 18 which serves as the communication medium of the multicomputer system 17 and carries communications passing between the multiprocessor systems 20. The local communication bus 21 of each multiprocessor system 20 is interfaced to the system bus 18 by its own system bus interface 19.

The multiprocessor systems 20 may have differing capabilities, be dedicated to different applications, or be situated at different locations. Interconnection of the multiprocessor systems 20 by the system bus 18 to form the multicomputer system 17 provides users of any one multiprocessor system 20 with the power and capabilities of the full multicomputer system 17.

Being comprised of a plurality of multiprocessor systems 20, the multicomputer system 17 is also a multiprocessor system. However, it is referred to by a different name in order to differentiate it in the succeeding discussion from its component multiprocessor systems 20.

While the multiprocessor systems 20 may have different capabilities and may each be comprised of different functional units, the architecture and means of operation of the multiprocessor systems 20 is the same. Therefore, only one of the multiprocessor systems 20 will be discussed, with the understanding that the discussion applies to each of the multiprocessor systems 20.

Furthermore, as was mentioned above, each multiprocessor system 20 is a computer in its own right, capable of functioning wholly independently of any interconnection with other multiprocessor systems 20. Therefore, the following discussion which treats a multiprocessor system 20 and any of the subunits thereof will be understood to pertain to stand-alone multiprocessor systems 20 as well as to multiprocessor systems 20 which are part of a multicomputer system 17.

Figure 2:
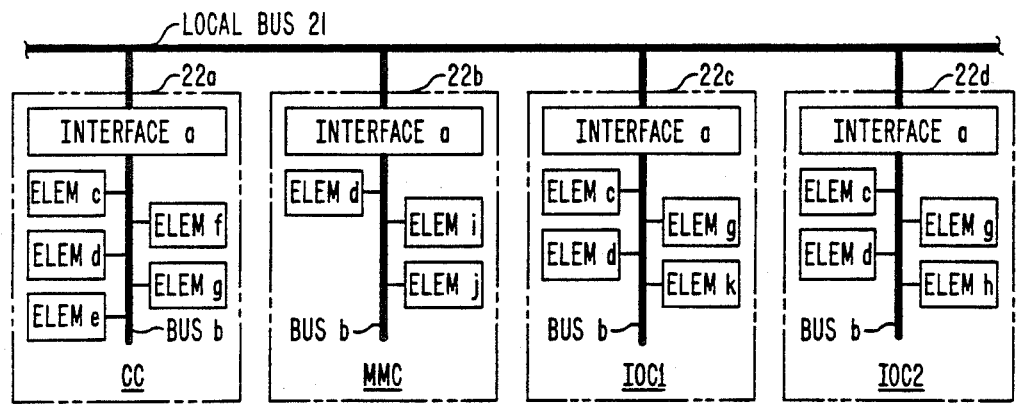
FIG. 2 is a block diagram of the logical configuration of a multiprocessor system of FIG. 1.

A representative multiprocessor system 20 is shown in FIG. 2. The system 20 comprises a plurality of units, or stations 22, of which four stations 22a-d are shown in FIG. 2. Various functions that need to be performed by the system 20 are distributed among the stations 22. Each station 22 of the system 20 is dedicated to performing some function, which function is commonly different from the functions of the other stations 22, but the stations 22 cooperate with each other in carrying out system tasks. Thus, for example, a first station 22a functions as the central controller (CC) of the multiprocessor system 20, performing data processing operations and coordinating system activities; a second station 22b functions as the main memory controller (MMC) of the multiprocessor system 20, providing control of storage in, and retrieval from, main memory of programs executing in the central controller 22a and of data required or produced by the central controller 22a during program execution; and third and fourth stations 22c and 22d function as an input and output controllers (IOC), controlling and coordinating the functions of various peripheral devices such as provide the multiprocessor system 20 with bulk storage or communications with the outside world. Other stations 22 (not shown) with similar or different functional capabilities as the stations 22a-d may be included in the multiprocessor system 20. The function of each station 22 is dictated by its internal composition and, in the case of an intelligent station, by the program executing on its processor. Stations 22 may be added to or deleted from the system 20 as required by the applications to which the system 20 is being put. Henceforth reference to a station 22 will generally be understood to refer to any station in the system 20.

For the purpose of cooperating with each other in carrying out system tasks, the stations 22 of the multiprocessor system 20 are interconnected by a local bus (LB) 21, which serves as the communication medium for the stations 22. The communication network formed by the stations 22 and the local bus 21 allows any station 22 within the system 20 to communicate with any other station 22.

Figure 4:
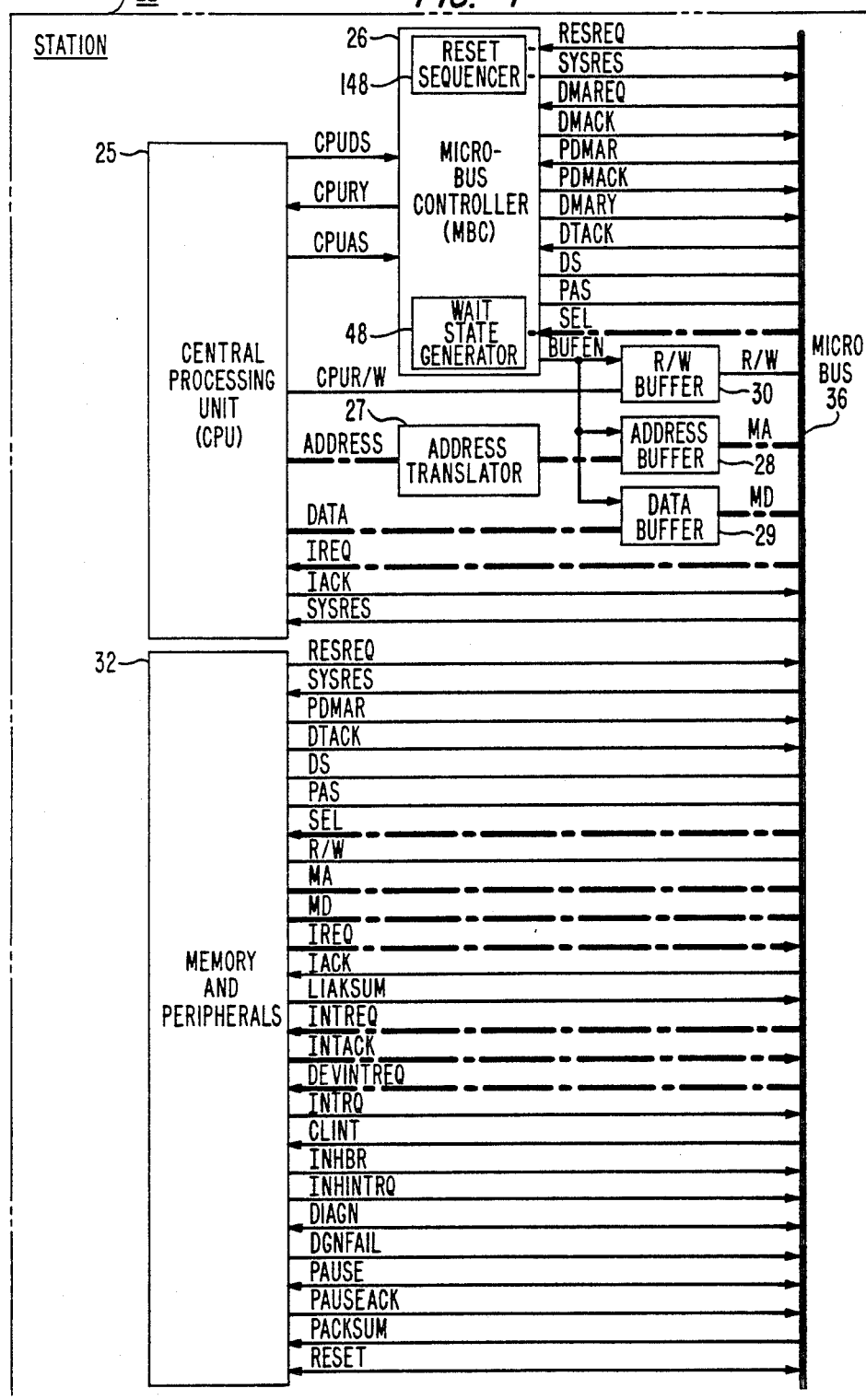
FIGS. 4 and 5 together form a block diagram of the physical configuration of a station of the multiprocessor system of FIG. 2.
Figure 5:
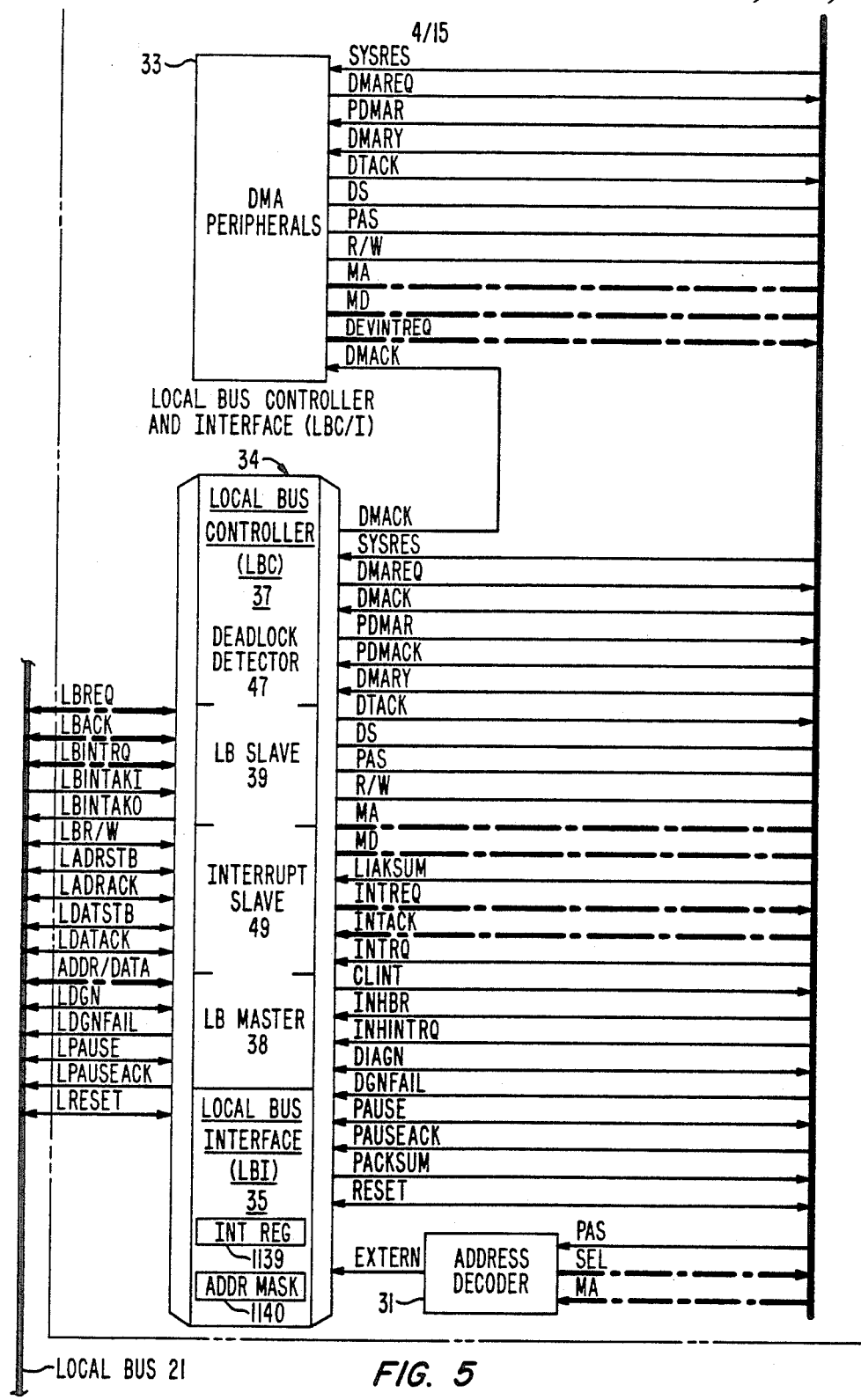

The logical configuration of the stations 22 of the multiprocessor system 20 is also shown in FIG. 2. The physical configuration of a station 22 is shown in FIGS. 4 and 5 and is discussed further below. As shown in FIG. 2, the logical internal configuration of the stations 22 of the multiprocessor system 20 parallels at the highest level the configuration of the multiprocessor system 20 itself. Logically, each station 22 is comprised of a plurality of functional elements, which are variously designated in FIG. 2 by letters c through j, interconnected by a communication bus designated by letter b and interfaced to the local bus 21 by an interface unit designated by letter a. But not all of the stations 22 need contain all, or the same, elements c through j.

Thus, for illustrative purposes, the central controller 22a is shown in FIG. 2 as comprising a communication bus b interfaced to the local bus 21 by an interface a. Connected to the bus b are a plurality of elements c, d, e, f, and g. Element c may for example, represent a processor, element d may represent a read only memory (ROM), element e may represent a memory management unit, element f may represent a local bus 21 arbiter, and element g may represent an interrupt controller. It should be understood that these examples are being given for purposes of illustration and are in no manner intended to be limiting.

In like manner, the main memory controller 22b is shown in FIG. 2 as comprising a comminication bus b interfaced to the local bus 21 by an interface a. Connected to the bus b are a plurality of elements d, i, and j, where for example, element d may again represent a ROM while elements i and j may represent a pair of random access memory (RAM) arrays.

Similarly, each input and output controller 22c and 22d is shown as comprising an interface a interfacing a bus b to the local bus 21. Each controller 22c and 22d is shown with a plurality of elements c, d, g, and h connected to the bus b. Element c may agan represent a processor, element d may again represent a ROM, element g may once again represent a interrupt controller, while element h may represent an input and output peripheral.

Thus it may be seen that certain elements, such as the interface a and ROM d are common to all stations 22, other elements, such as the processor c and the interrupt controller g are common to only some of the stations 22, while other elements, such as the memory arrays i and j, are unique to one station 22.

It may be noted at this point that the structural hierarchy of the multicomputer system 17 of FIG. 1 is very regular, comprising at each level a plurality of functional elements interfaced to a communication medium. Thus, the multicomputer system 17 comprises a plurality of multiprocessor systems 20 connected to a system bus 18. Similarly, each distributed computer system 20, (see FIG. 2) comprises a plurality of stations 22 connected to a local bus 21. Each local bus 21 is interfaced to the system bus 18 by a system bus interface 19. In the like manner, as shown in FIG. 2, each station 22 comprises a plurality of functional elements, variously designated c–j, connected to a bus b, and each bus b is interfaced to the local bus 21 by an interface a.

Figure 3:
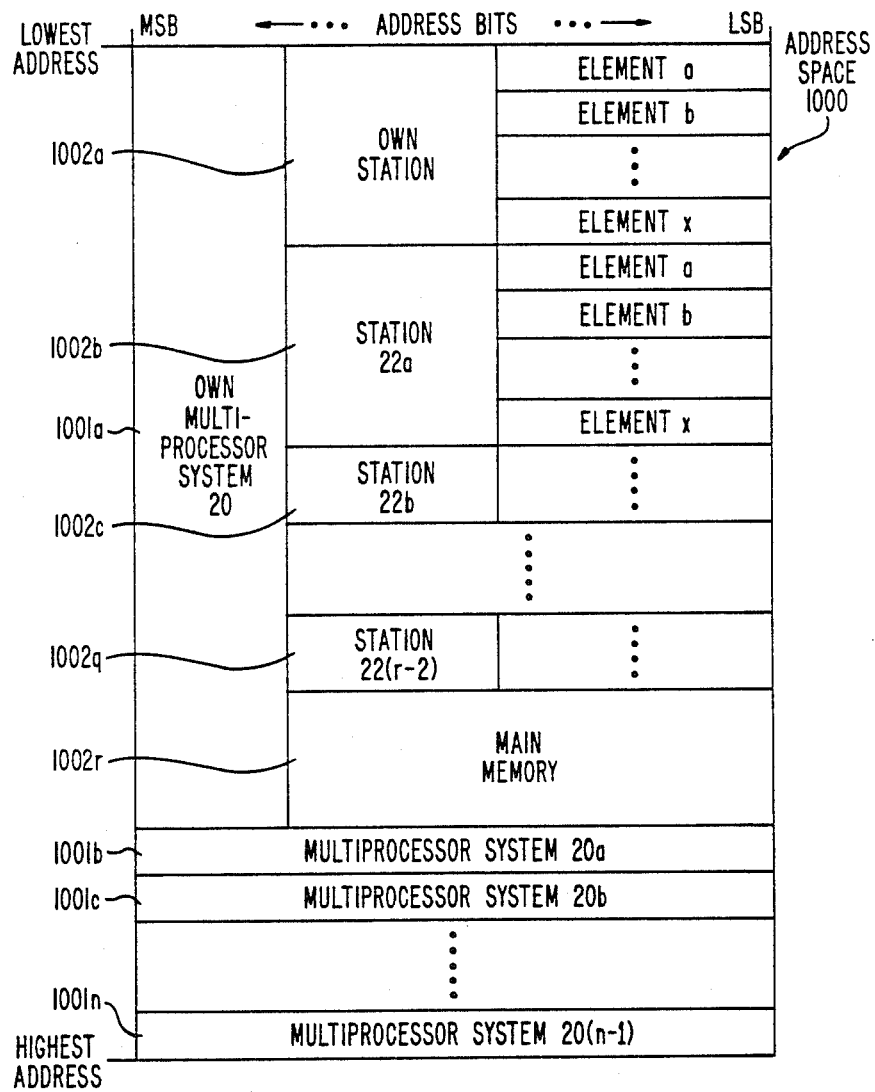
FIG. 3 is a logical layout diagram of the address space of the multicomputer system of FIG. 1.

Turning now to FIG. 3, there is shown the address space of the multicomputer system 17. The system 17 has a single, common, unified physical address space 1000. All addressable entities within the multicomputer system 17 are mapped into the common address space 1000 in the manner shown in FIG. 3. The address space 1000 encompasses all addresses of the whole multicomputer system 17. Any address in the address space 1000 can be expressed by the values of a plurality of address bits ranging from the most significant bit (MSB) to the least significant bit (LSB). The address space 1000 is divided into a plurality of superblocks 1001a-n of addresses, where (n−1) is the maximum number allowable of multiprocessor systems 20 in the multicomputer system 17. The superblocks 1001 are all of equal size. A superblock 1001 forms the address space of one multiprocessor system 20. The $\log_2 n$ most significant bits of an address identify the multiprocessor system 20 to to which the address belongs.

Each superblock 1001b-n is dedicated to, uniquely associated with, a single multiprocessor system 20. The first superblock 1001a of the address space 1000, that is, the superblock 1001 addressed by the lowest addresses in the address spectrum of the address space 1000, is special, in that each multiprocessor system 20 considers the superblock 1001a to be its own. Thus addressing within each multiprocessor system 20, see FIG. 2, along that system's local bus 21, may proceed within the context of addresses of the first superblock 1001a, while addressing between different multiprocessor systems 20, along the system bus 18, must proceed within the context of addresses of the superblocks 1001b-n in order to specify the multiprocessor system 20 for which the address is intended.

There is a one-to-one correspondence, or association, between the addresses of a dedicated superblock 1001b-n and the addresses of the common superblock 1001a. The correspondence is such that an address from the dedicated superblock 1001b-n differs from the associated address from the common superblock 1001a only by the most significant bits, which bits identify the multiprocessor system 20 with which each superblock 1001b-n is associated.

Referring to FIGS. 1 and 3, an address from the superblock 1001a and appearing on a local bus 21 within a multiprocessor system 20 is considered to be an intrasystem 20 address, and consequently it is not interfaced to the system bus 18 by the multiprocessor system's bus interface 19. But when an address referring to one of the other superblocks 1001b-n appears on a local bus 21, the associated system bus interface 19 interfaces the address to the system bus 18, in accordance with the communication protocol of the system bus 18. Each system bus interface 19 monitors the address appearing on the system bus 18, for addresses from the dedicated superblock 1001b-n associated with its multiprocessor system 20.

Each system bus interface 19 ignores the addresses of foreign superblocks 1001b-n and does not interface the system bus 18 to the associated local bus 21 in response thereto. But a system bus interface 19 responds to an address from the superblock 1001b-n which is associated with its multiprocessor system 20 by interfacing the system bus 18 with its local bus 21 and transferring the address to the local bus 21, in the process, translating the address into the corresponding common superblock 1000a address. The translation is preferably performed by merely masking the $\log_2 n$ most significant bits of the dedicated superblock 1001b-n address to convert it into the corresponding common superblock 1001a address.

In a manner analogous to the subdivision of the address space 1000 into superblocks 1001, each superblock 1001 is divided into a plurality r of blocks 1002a-r, where (r−2) is the maximum allowable number of stations 22 in the multiprocessor system 20. The first (r−1) blocks 1002a-q of each superblock 1001, that is, the blocks 1002 addressed by the lowest addresses in the address spectrum of each superblock 1001, are of equal size, and each forms the address space of a station 22 of the associated multiprocessor system 20. The block 1002r of each superblock 1001 is assigned to main memory of the associated multiprocessor system 20.

Just as the first $\log_2 n$ most significant bits of an address identify the multiprocessor system 20 which is being addressed, the next few most significant bits of the address either identify the station 22 of a multiprocessor system 20 which is being addressed, or indicate a main memory address. Analogously to the superblocks 1001a-n of the address space 1000, each block 1002b-q of a superblock 1001 is dedicated to, uniquely associated with, a single station 22, and the first block 1002a of each superblock 1001 is special, in that each station 22 considers the block 1002a to be its own.

Thus addressing within each station 22, see FIG. 2, along that station's bus b, may proceed within the context of addresses of the first block 1002a, while addressing between different stations 22 of a multiprocessor system 20, along that system's local bus 21, must proceed within the context of addresses of the blocks 1002b-q in order to specify the station 22 for which the address is intended.

There is a one-to-one correspondence, or association, between the addresses of a dedicated block 1002b-q and the addresses of the common block 1002a. The correspondence is preferably such that the address from the dedicated block 1002b-q differs from the associated address from the common block 1002a by the most significant bits, which bits identify the station 22 with which the block 1002b-q is associated.

Referring to FIGS. 2 and 3, an address from the block 1002a appearing on a bus b of a station 22 is considered to be an intra-station 22 address, and consequently it is not interfaced to the local bus 21 by the station's local bus interface a. But when an address referring to one of the other blocks 1002b-q appears on the bus b, the associated interface a interfaces the address to the local bus 21, in accordance with the communication protocol of the local bus 21.

Each interface a monitors the addresses appearing on the local bus 21 for addresses from the dedicated block 1002b-q associated with its station 22. Each interface a ignores the addresses of foreign blocks 1002b-q and does not interface the associated bus b to the local bus 21 in response thereto. But an interface a responds to an address from the dedicated block 1002b-q associated with its station 22 by interfacing the local bus 21 with its bus b and transferring the address to the bus b, in the process translating the address into the corresponding common block 1002a address. The translation is preferably performed by merely masking the the station 22-identifying most significant bits of the address to convert it into the corresponding common block 1002a address. Addresses from the block 1002r do not undergo this form of translation.

The elements of each station 22 are mapped into the address spectrum of the common block 1002a in like manner. That is, elements, or addressable portions of elements, of the stations 22 which are common to a plurality of stations 22, that is, which have functional counterparts in a plurality of stations 22, are mapped into the same addresses in the common block 1002a. In those stations 22 which do not possess one or more of these common elements, the addresses corresponding to these elements are not used.

For example, if a particular addressable register of the interrupt controller g of the CC 22a (see FIG. 2) has an address x associated therewith in the common block 1002a, the registers having like functions in the interrupt controllers g of the IOCs 22c and 22d, and of any other station 22 in the multiprocessor system 20, have the same address x associated therewith in the common block 1002a. A station 22, such as the MMC 22b, which does not contain an interrupt controller g, and hence does not have the above-mentioned register, does not have the address x assigned to any element. However, should an interrupt controller g with such a register be added to the MMC 22b, that register would be assigned the address x.

Because of the correspondence, described previously, between the addresses of the common block 1002a and the dedicated blocks 1002b–q, addressable entities of all stations 22 that have functional counterparts in at least one other station 22 not only have the same common block 1002a address as their counterparts, but also each have a dedicated address which differs from the dedicated addresses of their counterparts and from their common block 1002a addresses only by the most significant bits that identify the particular station 22 of which those entities belong. The above-described address assignment scheme is illustrated in FIG. 3, which shows corresponding addresses of each block 1002a–q assigned to like addressable logical elements a through x of the associated stations 22.

The above-described addressing scheme allows the addressable hardware elements of a station 22 to be configured at any addresses or, correspondingly, allows any station 22 to be configured in any physical backplane slot if a backplane local bus 21 is utilized, without affecting any software included in the station 22 and intended for execution by the hardware of that station 22. This solves a common configurational problem for systems like the system 20 which include a plurality of stations 22 of the same type that have substantially identical programs stored in their respective memories. As was discussed in conjunction with FIGS. 2 and 3, the stations 22 of the system 20 are configured along the some general basic parameters. Intelligent stations 22, that is, stations which include their own processor, such as the CC 22a and the IOC1 22c and the IOC2 22d of FIG. 2 having the element c, have the same basic hardware configuration and operational characteristics, which are diagramed in FIGS. 4 and 5. The intelligent stations 22 differ in the programs which they execute and in applications hardware with which they interact, which hardware and software customizes the station 22 for its designated functions, and hence is dependent upon the particular use to which the basic intelligent station 22 of FIGS. 4 and 5 is being put.

On the other hand, passive stations 22, that is, stations which do not include their own processor, such as the MMC 22b of FIG. 2 which is shown as having no element c, do not necessarily include all of the hardware and capabilities of the station 22 of FIGS. 4 and 5. The extent to which a passive station 22 needs to possess the basic hardware configuration and operational characteristics of the station 22 of FIGS. 4 and 5 is, again, dependent upon the station's application. However, to the extent that such stations 22 posess the configuration and capabilities of the station 22 of FIGS. 4 and 5, these passive stations 22 may be considered to be subsets of the hardware and operational characteristics of the station 22 of FIGS. 4 and 5.

In the manner just described, then, the station 22 of FIGS. 4 and 5 may be considered to be representative of all of the stations 22 of the system 20, and only the one station 22 will therefore be discussed in detail. Adaptation of the basic station 22 of FIGS. 4 and 5 to particular applications is a function of the applications and lies within the skill of the art. To the extent described above, the stations 22 of a multiprocessor system 20 may be considered to be like one another even following their adaptation to a particular application.

Figure 9:
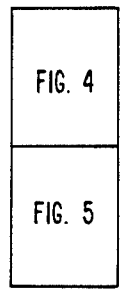
FIG. 9 shows the association of FIGS. 4 and 5 to portray the station of the multiprocessor system of FIG. 2.
Figure 10:
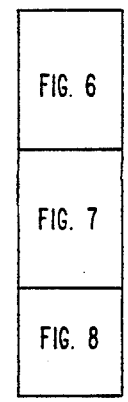
FIG. 10 shows the association of FIGS. 6 through 8 to portray the memory and peripherals of the station of FIG. 9.

Turning now to a consideration of the representative station 22, its physical configuration is diagramed in block form in FIGS. 4 and 5 which, when taken together, portray the station 22, as shown in FIG. 9. The station 22 is comprised of a central processing unit (CPU) 25, memory and peripherals 32, and direct memory access (DMA) peripherals 33, which devices are interconnected for communication by a microbus (MB) 36. The CPU 25 performs logic and arithmetic operations of the station 22. The memory and peripherals 32 comprise one or more storage units and also include applications circuitry and software which customize the station 22 for its intended application. Relevant portions of the memory and peripherals 32 are diagramed in block form in FIGS. 5 and 6 and are discussed further in conjunction with those figures. The units of the memory and peripherals 32 are passive resources, in that they may be accessed by other devices, such as the CPU 25, over the microbus 36, but are themselves not capable of addressing other devices over the microbus 36. Resources such as input/output units having the capability of addressing other devices, such as the memory and peripherals 32, are included in the DMA peripherals 33.

The CPU 25 is interfaced to the microbus 36 by a microbus controller (MBC) 26 and by an address buffer 28, a data buffer 29, and a read and write (R/W) buffer 30. The MBC 26 monitors the status of the station 22 and coordinates the use of the microbus 36. The MBC 26 controls the buffers 28–30 and through them can selectively disconnect the CPU 25 from the microbus 36.

Figure 17:
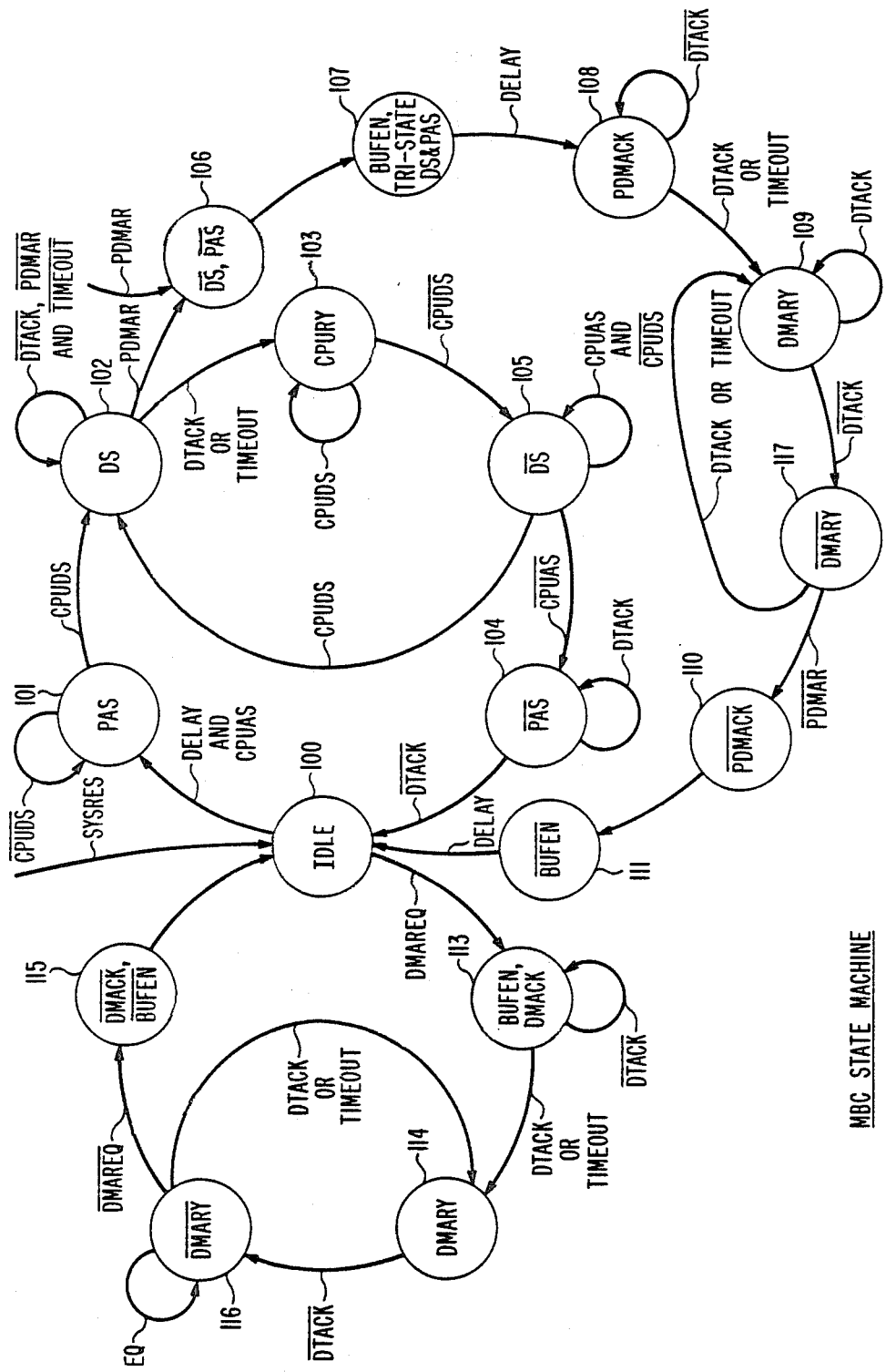
FIG. 17 is a state diagram of the microbus controller of FIG. 4.

The MBC 26 is a finite state machine which is defined by the state diagram of FIG. 17. Finite state machines are well known in the art and may be implemented in a variety of ways. For example, a finite state machine may be implemented by an appropriately programmed microprocessor or programmable logic array. The details of implementation are a function of the available technology and are well within the skill of those knowledgeable in the art. For the sake of brevity, the details of finite state machine implementation are not shown or described for this illustrative embodiment. However, finite state machines are customarily defined in terms of the sequence of states of the machine and operations to be executed in each state. FIG. 17 represents such a state diagram of the MBC 26. It shows the states and state transitions and indicates, by means of notation, certain functions executed by the MBC 26. In addition, the MBC 26 includes a wait state generator 48, which is substantially a conventional circuit that generates an output signal following some delay after the receipt of the input signals, wherein the input signals determine the duration of the delay. The MBC 26 also includes a reset sequencer 148. The state diagram and functions of the MBC 26 are described in detail further below.

The microbus 36, and hence the station 22, is interfaced for communication with the local bus 21 by a local bus controller and interface (LBC/I) 34. The LBC/I 34 requests use of the local bus 21 on behalf of the CPU 25 and the DMA peripherals 33 of the station 22 when these devices wish to access another station 22 of the system 20. Likewise the LBC/I 34 provides for access of the microbus 36 by other stations 22 wishing to communicate with devices of this station 22, such as the memory and peripherals 32 or the DMA peripherals 33. Additionally, the LBC/I 34 coordinates and interfaces the communications passing between the local bus 21 and the microbus 36.

The LBC/I 34 includes a local bus interface (LBI) 35, which is responsible for interfacing address and data portions of the microbus 36. The LBI 35 is comprised of the necessary buffers, gates, drivers, and logic to accomplish this purpose. Its construction is a function of the structure and organization of the microbus 36 and the local bus 21, and lies within the scope of knowledge of the art. The LBI 35 also includes an interrupt register 1139 for the purpose of implementing station 22-to-station 22 vectored hardware interrupts, as will be explained below. The LBI 35 further includes an address mask 1140 for masking from an address the bits identifying a station 22 and these converting addresses from the dedicated block of addresses 1002b-q dedicated to the station 22 and appearing on the local bus 21 into addresses of the common block 1002a, for output on the microbus 36.

The LBC/I 34 also includes a local bus controller (LBC) 37, which is responsible for interfacing status and control portions of the microbus 36 and the local bus 21. The LBC 37 is comprised of an LB master 38 which controls communications on the local bus 21 initiated by the station 22, an LB slave 39 which controls communications on the microbus 36 initiated by other stations 22 across the local bus 21, a deadlock detector 47 which detects and signals the occurrences of a deadlock condition, and an interrupt slave 49 which facilitates inter-station hardware interrupts. Like the MBC 26, the LB master 38, the LB slave 39, the deadlock detector 47, and the interrupt slave 49 are finite state machines, and they are defined by the state diagrams of FIGS. 20-21, respectively. The state diagrams and functions of the units 38, 39, 47 and 49 are described in detail further below. Additionally, these units include the necessary buffers to properly electrically buffer the status and control signals passing therethrough, in a manner known to the art.

On the one side, the LBC/I 34 is connected to the local bus 21, as shown in FIG. 5. The local bus 21 is comprised of a plurality of communication paths. These include a plurality of LBREQ (local bus access request) lines, a plurality of LBACK (local bus access acknowledge) lines, a plurality of LBINTRQ (local bus interrupt request) lines, a plurality of local bus acknowledge lines each daisy-chained through stations 22 and therefore shown as comprised of a LBINTAKI (local bus interrupt acknowledge input) line and a LBINTAKO (local bus interrupt acknowledge output) line, an LB R/W (local bus read and write) line, a LADRSTB (local bus address strobe) line, a LADRACK (local bus address acknowledge) line, a LDATSTB (local bus data strobe) line, a LDATACK (local bus data acknowledge) line, a multiplexed ADDR/DATA (address and data) bus, a LDGN (local bus diagnostic) line, a LDGNFAIL (local bus diagnostic failure) line, a LPAUSE (local bus pause) line, a LPAUSEACK (local bus pause acknowledge) line, and a LRESET (local bus reset) line. The functions of these communication paths of the local bus 21 will be discussed below as part of the discussion of the operation of the station 22 of FIGS. 4 and 5.

On the other side, the LBC/I is connected to the microbus 36. As was mentioned above, the micro bus 36 serves as the communication link between the various devices of the station 22. The microbus 36 is comprised of an address bus MA (microaddress), a data bus MD (microdata), and a plurality of status and control lines, the relevant ones of which will be described below. The microbus 36 is a Tri-state ® mode bidirectional bus: the MA and MD buses and some of the control lines which comprise the microbus 36 are adapted to selectively assume any one of three conditions or signal levels, and signals can travel on those buses and lines in both directions. For purposes of this example the three levels are considered to be the following: a first level in which a signal is considered to be asserted; a second level in which the inverse of the signal is considered to be asserted, or equivalently the signal is considered to be deasserted; and a third neutral level, referred to as the Tri-state level, in which neither the signal nor its inverse is considered to be asserted. Henceforth, a reference to the microbus 36 as being in Tri-state mode is intended to indicate that those buses and control lines of the bus 36 which are capable of assuming the Tri-state mode are placed in the Tri-state level.

Lines of the bus 36 which are not adapted to assume the Tri-state condition are adapted to selectively assume one of two levels: a high level in which the lines are considered to be idle, deasserted or floating, and a low level in which the lines are considered to be active asserted.

Considering now the routing of the microbus 36 in the station 22 of FIGS. 4 and 5, the bidirectional Tri-state mode MD bus is connected to data ports of the LBC/I 34, the DMA peripherals 33, the memory and peripherals 32, and the data buffer 29. A DATA bus interconnecting a second port of the data buffer 29 with a data port of the CPU 25 serves to connect the CPU 25 to the MD bus.

The bidirectional Tri-state mode MA bus is similarly connected to address ports of the LBC/I 34, the DMA peripherals 33, the memory and peripherals 32, and the address buffer 28. A second port of the address buffer 28 is connected to a physical address port of an address translator 27, whose virtual address port is connected by an ADDRESS bus to an address port of the CPU 25. The ADDRESS bus thus serves to connect the CPU 25 with the MA bus. The address translator 27 is a device which translates virtual addresses used by the CPU 25 into physical addresses used by the rest of the station 22. Such devices are well known in the art.

The MA bus is also connected to an input port of an address decoder 31, whose output is connected to an input of the LBC/I 34 by an EXTERN line. The decoder 31 monitors the addresses on the MA bus and signals the LBC/I 34 via the EXTERN line when it detects on the MA bus an address which is not a common block 1002a address (see FIG. 3), i.e., an address which requires the microbus 36 to be interfaced to the local bus 21. The address decoder 31 is also connected to a plurality of SEL (select) lines one or more of which it selectively activates in response to detecting predetermined intra-station 22 addresses on the MA bus. Such decoders are also known in the art. The SEL lines form inputs to the wait state generator 48 of the MBC 26 and to the memory and peripherals 32.

A bidirectional Tri-state mode R/W (read and write) line interconnects the memory and peripherals 32, the DMA peripherals 33, the LBC/I 34, and the R/W buffer 30. Connection between the CPU 25 and the buffer 30 is made by a CPUR/W line, which thus serves to connect the CPU 25 to the R/W line. The state of the line R/W indicates whether a "read" or a "write" operation is being performed over the microbus 36.

A unidirectional control line DTACK (data acknowledge), and bidirectional Tri-state mode control lines PAS (physical address strobe) and DS (data strobe) interconnect the memory and peripherals 32, the DMA peripherals 33, the LBC/I 34, and the MBC 26. The line PAS additionally connects to an input of the address decoder 31. Unidirectional lines DMARY (direct memory access ready), DMAREQ (direct memory access request), and PDMAR (preemptive direct memory access request) interconnect the DMA peripherals 33, the LBC/I 34, and the MBC 26. The PDMAR line also connects to the memory and peripherals 32. Unidirectional line DMACK (direct memory access acknowledge) leads from the MBC 26 through the LBC/I 34 to the DMA peripherals 33. Unidirectional line PDMACK (preemptive direct memory access acknowledge) provides a connection between the LBC/I 34 and the MBC 26, and unidirectional control lines CPURY (central processing unit reply), CPUDS (central processing unit data strobe), CPUAS (central processing unit address strobe) connect the MBC 26 with the CPU 25.

Additionally, a RESET bidirectional control line leads between the LBC/I 34 and the memory and peripherals 32. A RESREQ (reset request) unidirectional line runs from the memory and peripherals 32 to the MBC 26, and a SYSRES (system reset) unidirectional line runs from the MBC 26 to the CPU 25, to the memory and peripherals 32, to the DMA peripherals 33, and to the LBC/I 34. An IREQ (CPU interrupt request) unidirectional bus connects from the memory and peripherals 32 to the CPU 25, while an IACK (CPU interrupt acknowledge) unidirectional line returns from the CPU 25 to the memory and peripherals 32. One or more DEVINTREQ (device interrupt request) unidirectional lines lead from the DMA peripherals 33 to the memory and peripherals 32. Furthermore, the memory and peripherals 32 and the LBC/I 34 are interconnected by a unidirectional LIAKSUM (local bus interrupt acknowledge sum) line, one or more pairs of unidirectional INTREQ (local bus interrupt request) and INTACK (local bus interrupt acknowledge) lines, a unidirectional INTRQ (interrupt request) line, a unidirectional CLINT (clear interrupt) line, a unidirectional INHINTRQ (inhibit interrupt request) line a unidirectional INHBR (inhibit local bus access request) line, a bidirectional DIAGN (diagnose) line, a unidirectional DGNFAIL (diagnostic failure) line, a bidirectional PAUSE line, a unidirectional PAUSEBACK (pause acknowledge) line, and a unidirectional PACKSUM (pause acknowledge sum) line. The functions of the aforementioned lines of the microbus 36 is explained below as part of the discussion of the operation of the station of FIGS. 4 and 5.

The basic communication protocols of the local bus 21 and of the micro-bus 36 will be described next, to facilitate understanding of the operation and interplay of the devices within the station 22, and of the stations 22 within the system 20.

Figure 11:
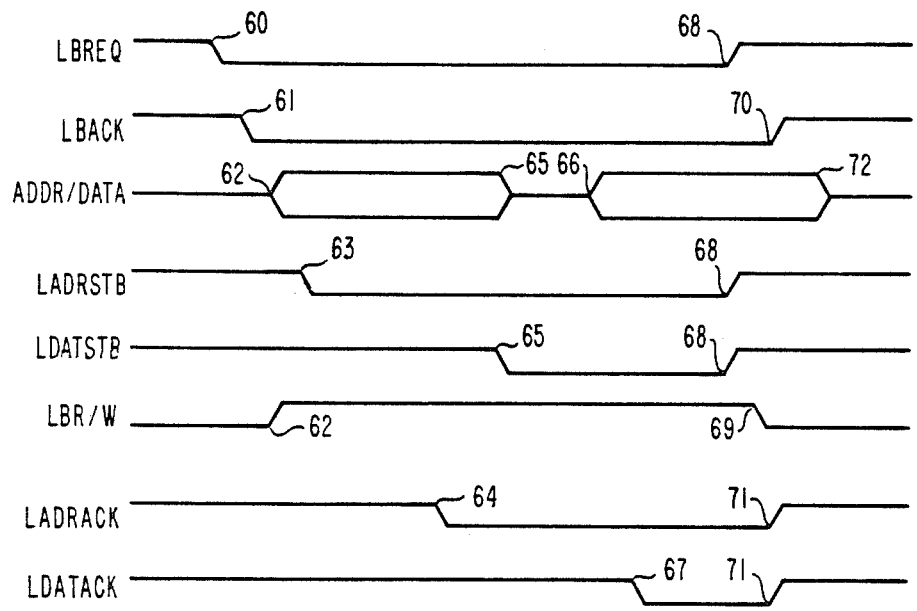
FIG. 11 is a timing diagram of the basic "read" protocol of the local bus of the multiprocessor system of FIG. 2.
Figure 12:
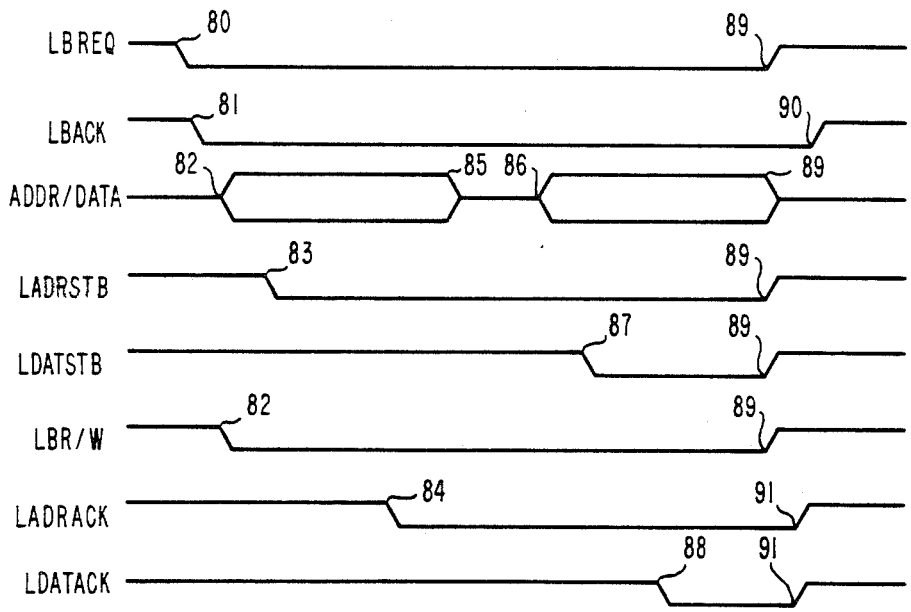
FIG. 12 is a timing diagram of the basic "write" protocol of the local bus of the multiprocessor system of FIG. 2.
Figure 13:
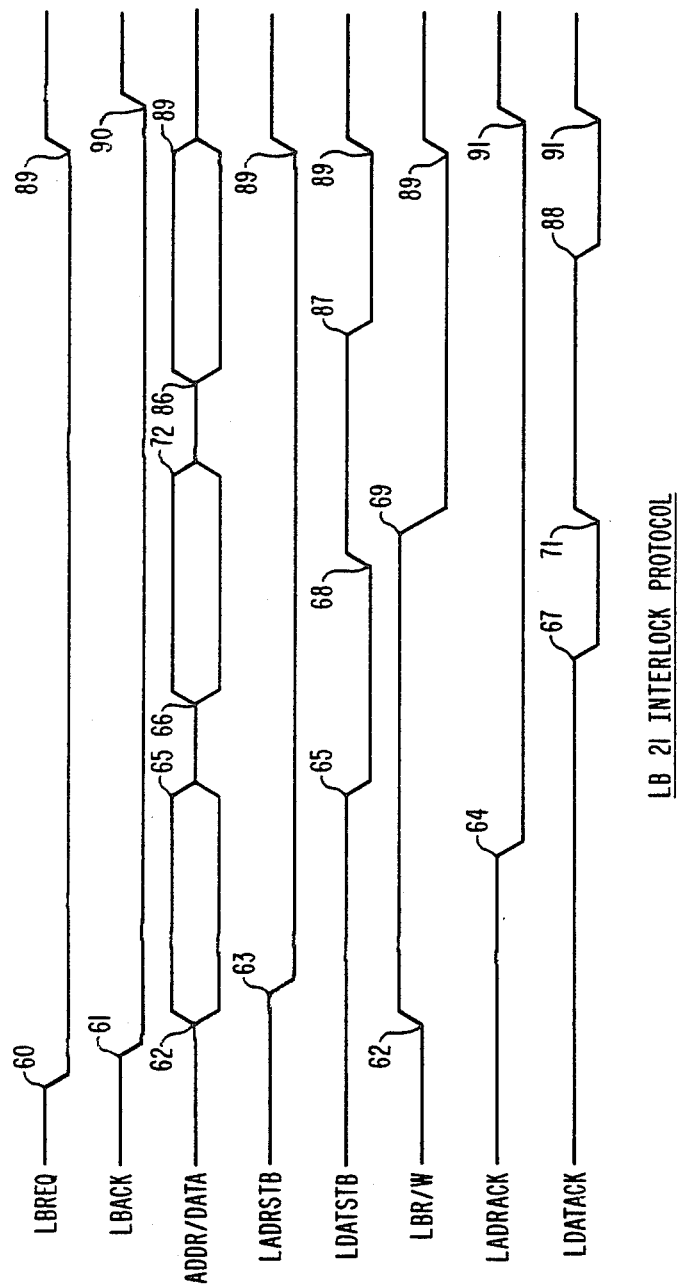
FIG. 13 is a timing diagram of the basic "interlock" protocol of the local bus of the multiprocessor system of FIG. 2.

The basic communication protocol of the local bus 21 is defined by the timing diagrams of FIGS. 11-13. FIG. 11 shows the protocol of a local bus "read" operation. Initially, the local bus 21 is assumed to be idle. A station 22, that is, a device of a station 22, wishing to gain control of the local bus 21 for purposes of communication, referred to as a bus master, and that wishes to perform a "read" operation on a second station, that is, on an addressable element or device of a second station, referred to as a bus slave, at time 60 asserts an LBREQ (local bus request) line of the local bus 21. Each station 22 capable of being a local bus master has an LBREQ line dedicated to it. The LBREQ lines lead to a local bus arbiter (not shown), which is commonly located in the CC 22a. The arbiter which selectively and in a known manner grants use of the local bus 21 to a station 22 by asserting that station's dedicated LBACK (local bus acknowledge) line.

Having received permission to use the local bus 21 at time 61, bus master at time 62 outputs the address—the dedicated block 1002b-q address or the main memory block 1002r address, see FIG. 3—of the element it desires to access in another station 22 onto an ADDR/DATA (address and data) bus of the local bus 21 and at the same time asserts high a LBR/W (local bus read and write) line of the local bus 21 to indicate to the bus slave that this is a "read" operation. After a period of delay which allows the signal values on the ADDR/DATA bus and the LBR/W line to settle, the bus master asserts a LADRSTB (local bus address strobe) line of the local bus 21 to signal that the values on the DR/DATA bus and the LBR/W lines are valid.

All stations 22 connected to the local bus 21 monitor the local bus 21. When one of the stations 22 detects an address from its dedicated block 1002b-q, or also when the the MMC 22b detects a main memory block 1002r address, on the local bus 21, indicating to that station 22 that it is the designated bus slave of this transaction, the bus slave responds by asserting at time 64 a LADRACK (local bus address acknowledge) line of the local bus 21.

The bus master monitors the LADRACK line, and upon detecting that the LADRACK line is asserted, at time 65 it removes the address from the ADDR/DATA bus, and asserts a LDATSTB (local bus data strobe) line of the local bus 21 to indicate to the bus slave that it is ready to receive data.

Upon detecting that the LDATSTB line is asserted, the bus slave outputs at time 66 the data onto the ADDR/DATA bus, and after a delay to allow the data values to settle, it asserts a LDATACK (local bus data acknowledge) line of the local bus 21 to signal the bus master that the values on the ADDR/DATA bus are valid.

Detecting that the LDATACK line is asserted, the bus master takes the data from the ADDR/DATA bus. When done, the master deasserts at time 68 the LBREQ, LADRSTB, and LDASTB lines, and after a momentary delay also deasserts the LBR/W line, at time 69.

In response to the loss of the LBREQ signal, the local bus arbiter deasserts the LBACK line at time 70, taking control of the local bus 21 away from the bus master. Similarly, responding to the loss of the LADRSTB and LDASTB signals, the bus slave deasserts the LADRACK and LDATACK lines at time 71. The times 70 and 71 are generally substantially simultaneous. Following a momentary delay after time 71, at time 72 the bus slave also removes the data from the ADDR/DATA bus. The "read" transaction is thus completed and the local bus 21 returns to the idle condition.

FIG. 12 shows the protocol of a local bus "write" operation, which is substantially similar to the protocol of the "read" operation. The local bus 21 is again initially assumed to be idle. A bus master wishing to perform a "write" operation on a bus slave asserts the LBREQ line at time 80 to request control of the local bus 21. Having received control of the local bus at time 81 from the local bus arbiter by assertion of the LBACK line, the bus master at time 82 outputs the address it wishes to access on the ADDR/DATA bus, and asserts low the LBR/W line to indicate to the bus slave that this is a "write" operation. After a delay period allowing the address values on the ADDR/DATA bus to settle and become valid, at time 83 the bus master asserts the LADRSTB line.

Again, all stations 22 connected to the local bus 21 monitor the local bus 21, and the designated bus slave station 22, recognizing the address on the local bus 21, responds to the bus master by asserting at time 84 the LADRACK line. The bus master responds to the assertion of the LADRACK line by removing at time 85 the address from the ADDR/DATA bus and replacing it, at time 86, with the data to be written. Following a delay to allow the data values to become settled on the ADDR/DATA bus, the bus master asserts the LDATSTB line at time 87.

The bus slave responds to the assertion of the LDATSTB line by taking the data from the ADDR/DATA line and writing it into the addressed location. When done, the bus slave signals the bus master by asserting the LDATACK line at time 88.

Detecting that the LDATACK line is asserted, at time 89 the bus master removes the data from the ADDR/DATA bus and deasserts the LBREQ, LADRSTB, LDATSTB, and LBR/W lines.

In response, the local bus arbiter deasserts the LBACK line at time 90, taking control of the local bus 21 away from the bus master, and at time 91 the bus slave responds to the loss of the LADRSTB and LDATSTB signals by deasserting the LADRACK and LDATACK lines. The times 90 and 91 are substantially simultaneous. The "write" transaction is thus completed and the local bus 21 returns to the idle condition.

FIG. 13 shows the protocol of an "interlock" operation on the local bus 21. A local bus "interlock" operation is a combination of local bus "read" and local bus "write" operations performed by a bus master on a bus slave in immediate succession. The utility and applications of the "interlock" operation are well known in the art.

For the "interlock" operation, the local bus 21 is again initially assumed to be idle. A bus master wishing to perform an "interlock" operation on a bus slave first performs a "read" operation, requesting control of the local bus 21 at time 60 by asserting the LBREQ line, obtaining local bus control by assertion of the LBACK line at time 61, outputting the address of the element to be interlocked on the ADDR/DATA bus at time 62 and simultaneously asserting high the LBR/W line, and asserting the LADRSTB line at time 63.

Upon recognition of the address the bus slave again responds by asserting the LADRACK line at time 64, to which the bus master responds at time 65 by removing the address from the ADDR/DATA line and asserting the LDATSTB line.

In response to the LDATSTB signal, the bus slave outputs the data on the ADDR/DATA bus at time 66 and asserts the LDATACK line at time 67.

Having received the data, the bus master at time 68 deasserts the LDATSTB line, but keeps the LBREQ and LADRSTB lines asserted, retaining control of the local bus 21 and connection to the bus slave. At time 69 the bus master does not deassert the LBR/W line, but asserts it low to signal a "write" operation.

The slave responds to the loss of the LDATSTB signal by deasserting the LDATACK line at time 71 and removing the data from the ADDR/DATA bus at time 72. As the LADRSTB remains asserted by the bus master, in response the LADRACK line remains asserted by the bus slave.

The bus master now begins the "write" portion of the interlocked operation, outputting data on the ADDR/DATA bus at time 86 and asserting the LDATSTB line at time 87.

The bus slave acknowledges the receipt of the data by asserting the LDATACK line at time 88, to which the bus master responds by deasserting at time 89 the LBREQ, LADRSTB, LDATSTB, and LBR/W lines and by removing the data from the ADDR/DATA bus.

In response, the LBACK line becomes deasserted at time 90, and at time 91 the bus slave deasserts the LADRACK and LDATACK lines. The local bus interlocked instruction is thus completed and the local bus 21 returns to an idle condition.

The basic communication protocol of the microbus 36 is defined by the timing diagrams of FIGS. 11-13. It will be noted that this protocol is very similar to the protocol of the local bus 21, just described.

Any device other than the CPU 25 wishing to gain control of the microbus 36 for purposes of communication, referred to again as a bus master, must first request the bus 36 by asserting the DMAREQ line and be granted use of the bus 36 by the CPU 25 by assertion of the DMACK line. The CPU 25 is a "default" bus master, in that it is the master of the bus 36 at all times when another device is not the bus master and hence the CPU 25 need not request use of the bus 36.

FIG. 11 shows the protocol of a microbus "read" operation. Initially the microbus 36 is assumed to be in the tri-state mode and idle. A bus master and that wishes to perform a "read" operation on a second device, referred to again as a bus slave, outputs the address of the bus slave onto the MA bus at time 40. Substantially at the same time 40 the bus master asserts high the R/W line to signal the devices that this is a "read" operation.

Following a delay to allow the state of the MA bus to settle, the master asserts at time 41 the PAS (physical address strobe) line to signal devices connected to the microbus 36 that an address is present on the MA bus. Each device monitors the address on the MA bus to determine if it is being addressed. Thereafter at time 42 the bus master asserts the DS (data strobe) line to signal the devices that it is ready to accept data. The bus slave, i.e., the device which recognized its address on the MA bus, responds to the "read" and DS signals by outputting the requested data onto the MD bus at time 43. Following a delay to allow the state of the data on the MD bus to settle, the bus slave asserts at time 44 the DTACK (data acknowledge) line to signal the bus master that it can go ahead and take the data from the MD bus. At time 45, when the bus master is done reading the data from the MD bus, it deasserts the MA bus and the PAS, DS and R/W lines, thus acknowledging the receipt of the data. When the bus slave detects the loss of the PAS signal, it responds at time 46 by deasserting the MD bus and the DTACK line. The microbus 36 then resumes the Tri-state and idle condition.

FIG. 12 shows the protocol of a microbus "write" operation, which is substantially similar to the protocol of the microbus "read" operation. The microbus 36 is again initially assumed to be in the Tri-state mode and idle. A bus master that has control of the bus 36 and that wishes to perform a "write" operation on a bus slave outputs the address of the bus slave onto the MA bus at time 50. Substantially at the same time 50 the bus master asserts low the R/W line to signal the bus slave that this is a "write" operation. The bus master also outputs the data to be written onto the MD bus at time 51. The time 51 may be earlier, later, or the same as time 50.

Following a delay after time 50 that allows the address values on the MA bus to settle, the bus master asserts the PAS line at time 52 to signal devices connected to the microbus 36 that an address is present on the MA bus. Each device again monitors the address to determine if it is being designated the bus slave. Following a delay after time 51 that allows the data values on the MD bus to settle, at time 53 the bus master asserts the DS line to signal that data from the MD bus may be accepted by the bus slave. The bus slave responds to the "write" and DS signals by taking the data from the MD bus and asserting at time 54 the DTACK line to acknowledge the receipt of the data. The bus master responds to the DTACK signal at time 55 by deasserting the MA and MD buses and the PAS, DA, and R/W lines. When the bus slave detects the loss of the PAS signal, it responds at time 56 by deasserting the DTACK line. The microbus 36 then resumes the Tri-state and idle condition.

FIG. 13 shows the protocol of an interlocked operation on the microbus 36. For the interlocked operation, the microbus 36 is again initially assumed to be in the Tri-state mode and idle. A bus master that has control of the bus 36 and that wishes to perform an interlocked operation on a bus slave first performs a "read" operation in the manner described in conjunction with FIG. 11, the exception being that at time 45 the bus master does not deassert the PAS line and the MA bus, but keeps them asserted. Substantially immediately after the time 45 the bus master performs a "write" operation in the manner described in conjunction with FIG. 12, with the following exception: as the MA bus and the PAS line have remained asserted from the previous read operation, the address, and hence the designated bus slave, have not changed, and no change in state occurs in the MA bus at time 50 or in the PAS line at time 52.

While the present example assumes a single DS line, alternatively the microbus 36 may include a DS bus comprised of a plurality of lines, wherein the DS signals specify to the slave the size of the data that is being read or written, for example a byte, a half-word, or a word. For purposes of this example, a byte comprises 8 bits, a half-word comprises 16 bits, and a word comprises 32 bits. Furthermore, the DS bus may carry separate DS signals for "read" and "write" operations, in which case the separate R/W line may be eliminated.

Deadlock, a condition characterized by two or more things waiting for related events which cannot happen, can occur in the system 20 when one station 22 attempts to access the local bus 21 while another station 22 has control of the local bus 21 and is trying to access the one station 22. Referring to FIGS. 4 and 5, deadlock occurs at the station 22 of FIGS. 4 and 5 when the CPU 25 or one of the DMA peripherals 33 of that station has control of the microbus 36 and is trying to access the local bus 21 through the LBC/I 34 for the purpose of communicating with another station 22, while some station 22 other than the station 22 of FIGS. 4 and 5 has control of the local bus 21 and is trying to access the microbus 36 through the LBC/I 34 for the purpose of communicating with the memory and peripherals 32 or the DMA peripherals 33 of the station 22 of FIGS. 4 and 5.

In these contemporaneous access situations deadlock is detected and signaled by the deadlock detector 47, and priority of access is resolved by the station 22 of FIGS. 4 and 5 in favor of the communication initiated by the other station 22 which already has control of the local bus 21. The CPU 25 of the station 22 of FIGS. 4 and 5 is disconnected from the micro bus 36, thus pausing its attempted communication, and the DMA peripherals 33 are forced to abandon their attempted communication, if any is occurring. The microbus 36 thus becomes freed for access from the local bus 21. When the access from the local bus 21 is completed, the DMA peripherals 33 may reattempt their planned communication, but the CPU 25 is simply reconnected to the microbus 36 to continue with its attempted communication from the point at which it was interrupted. Thus the access by a station 22 of the station 22 of FIGS. 4 and 5 is passive, i.e., it does not involve interaction with, or aid from, the intelligence, i.e., the CPU 25, of the station 22 of FIGS. 4 and 5.

Signaling involved in communications between the various devices of the station 22, and between the station 22 and the local bus 21, will now be considered, with reference being made to the state diagrams of FIGS. 17 through 20, to illustrate in greater detail the passive inter-station 22 communications, including the detection and resolution of deadlock in the system 20.

Turning first to the state diagram of the MBC 26, shown in FIG. 17, when communications between devices are not proceeding on the microbus 36, the MBC lies idle in IDLE state 100. In IDLE state, the MBC 26 and likewise the state machines of FIGS. 18 through 20 place outputs capable of assuming the Tri-state mode in the Tri-state level and deassert their bi-state outputs which are involved in the basic communication protocols, described above. In the IDLE state 100, priority of mastership of the microbus 36 is given by the MBC 26 to the CPU 25. Since the BUFEN (buffer enable) line is not asserted in the IDLE state 100, the CPU 25 is connected to the microbus 36 via the buffers 28–30 (see FIG. 4). To initiate communications, the CPU 25 merely starts communicating, while the devices 32–34 must first request use of the microbus 36 by asserting the DMAREQ (direct memory access request) line and then await grant of use of the microbus 36 via signals on the DMACK (direct memory access acknowledge) line, in direct analogy to the LBREQ-LBACK portion of the local bus 21 communication protocol which was described above. This explanation is expanded upon below.

Considering first communications of the CPU 25, to initiate communications the CPU 25 outputs on the ADDRESS bus the virtual address of the desired bus slave, outputs a "read" or a "write" signal on the CPUR/W (central processing unit read and write) line, and asserts the CPUAS (central processing unit address strobe) line to the MBC 26.

The address translator 27 translates the virtual address output by the CPU 25 into a physical address and outputs it to the MA bus via the address buffer 28. The signal on the CPUR/W line passes through the R/W buffer 30 onto the R/W (read and write) line and to the devices 32-34.

Referring to FIG. 17, the MBC 26 responds to the CPUAS signal by waiting a sufficient time to allow the address translator 27 to complete the address translation and for the physical address values to become settled on the MA bus, and then goes to state 101. In the state 101 the MBC 26 asserts the PAS (physical address strobe) line and waits for the assertion of the CPUDS (central processing unit data strobe) line by the CPU 25.

Since the MBC 26 has left the idle state 100 and therefore stopped monitoring the DMAREQ line when the CPU 25 asserted the CPUAS line, subsequent requests for use of the microbus 36 by the devices 32-34 are held in abeyance until the CPU 25 leaves the microbus 36 and the MBC 26 returns to the idle state 100. The exception to this rule is deadlock resolution, discussed further below.

The address on the MA bus and the PAS signal pass to the memory and peripherals 32, the DMA peripherals 33, and the address decoder 31. The devices 32 and 33 examine the address to determine whether they are the slave, i.e., whether they are being addressed. The address decoder 31 examines the address to determine if it is an off-station 22 address. If it is an off-station 22 address, the decoder 31 asserts the EXTERN (external) line to the LBC/I 34 to advise it that interfacing of the microbus 36 to the local bus 21 will be required.

The address decoder 31 also examines the address to determine if it is an address of a "dumb" device of the memory and peripherals 32, that is, a device which does not have full address recognition capability. If so, the address decoder 31 asserts the appropriate SEL (select) line or lines which lead to that "dumb" device to activate that device and make it responsive to micro 36 bus communications. The selective assertion of the SEL line or lines also indicates to the wait state generator 48 of the MBC 26 the length of delay that it should time.

In the case of a "read" operation, the CPU 25 asserts the CPUDS line when it is ready to receive data. In the case of a "write" operation, the CPU 25 outputs data onto the DATA bus and asserts the CPUDS line. The data, if any, pass through the data buffer 29 onto the MD bus and to the devices 32-34.

The MBC 26 responds to the CPUDS signal by going to the state 102 in which it asserts the DS (data strobe) line and awaits the assertion of the DTACK (data acknowledge) or PDMAR (preemptive direct memory access) lines, or the timing out of the wait state generator 48 which indicates the passage of the predetermined delay, as shown in FIG. 17. If one of the devices 32-33 and not the LBC/I 34 is chosen as the slave, deadlock cannot occur and therefore the MBC 26 will not receive a PDMAR signal from the LBC/I 34.

Assuming that one of the devices 32-33 is indeed selected as the bus slave, it responds to the DS signal and to the signal on the R/W line either by taking data off the MD bus in the case of a "write" operation, or by putting data on the MD bus in the case of a "read" operation, and by asserting the DTACK line.

If the bus slave device is a "dumb" device, described above, it does not have the capability of asserting the DTACK line. Rather, the timing out of the wait state generator 48 indicates to the MBC 26 that the "dumb" device has had adequate time to take data off the MD bus or place data on the MD bus. The MBC 26 thus treats the timeout signal from the wait state generator 48 as a substitute for the DTACK signal.

The data output onto the MD bus, if any, pass over the MD bus through the data buffer 29 and over the DATA bus to the CPU 25. The DTACK signal or the timing out of the wait state generator 48 is detected by the MBC 26, which responds by going to the state 103 and asserting the CPURY (central processing unit reply) line to the CPU 25. The MBC 26 then waits for the CPU 25 to deassert the CPUDS line.

In the case of a "write" operation, the CPURY signal informs the CPU 25 that the device 32-33 received the data. In the case of a "read" or an "interlock" operation, the CPURY signal informs the CPU 25 that data is ready on the DATA bus, and the CPU 25 takes the data off of the DATA bus. In either case, the CPU 25 responds by deasserting the CPUDS line, to which the MBC 26 responds by going to state 105 in which it deasserts the DS line and awaits either the deassertion of the CPUAS line or the reassertion of the CPUDS line.

If an interlocked instruction is being performed, the CPU 25 follows the deassertion of the CPUDS line by changing state of the CPUR/W line to indicate a "write" operation, and by outputting the data to be written onto the DATA bus and reasserting the CPUDS line. The MBC 26 responds by returning to the state 102 to carry out the "write" portion of the interlock operation.

In the case of a simple "read" or "write" operation, and after completion of the "write" portion of the "interlock" operation, the CPU 25 accompanies the deassertion of the CPUDS line by deassertion of the CPUAS line, and by placing the MA and MD buses and the R/W in the Tri-state level line as a consequence of deasserting the ADDRESS and DATA buses and the CPUR/W line. The MBC 26 responds to the loss of the CPUAS signal by going to state 104 in which state it deasserts the PAS line and awaits deassertion of the DTACK line. The bus slave device 32-33 responds to the loss of the PAS signal by deasserting the DTACK line, and by placing the MD bus in the Tri-state level in the case of a "read" operation.

The MBC 26 responds to the deassertion of the DTACK line by returning to the IDLE state 100, in which it places the PAS and DS lines in the Tri-state level. The communication from the CPU 25 to the devices 32-33 is thus completed.

Figure 18:
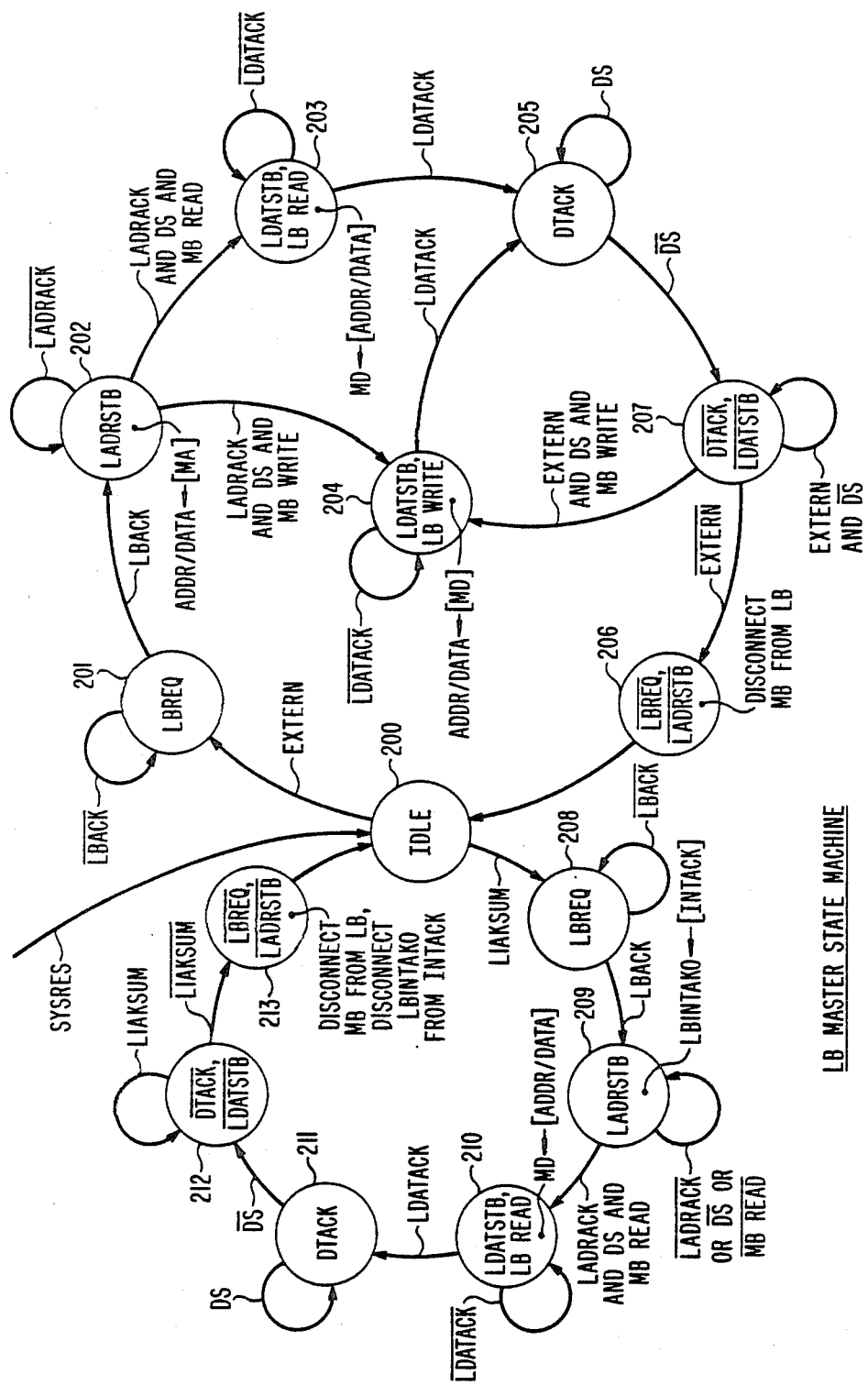
FIG. 18 is a state diagram of the local bus master of FIG. 5.

Considering instead the situation where the LBC/I 34 is selected by the CPU 25 as the bus slave, the LBC/I 34 will have been informed of this selection by the address decoder's 31 assertion of the EXTERN line, as was explained above. Because an off-station 22 access is indicated, the LB master 38 responds to the EXTERN signal by leaving its IDLE state 200 and going to state 201, as shown in FIG. 18, in which state it asserts its LBREQ (local bus request) line to request use of the local bus 21, and awaits the receipt of the LBACK (local bus acknowledge) signal that will grant it the requested use of the local bus 21.

Figure 20:
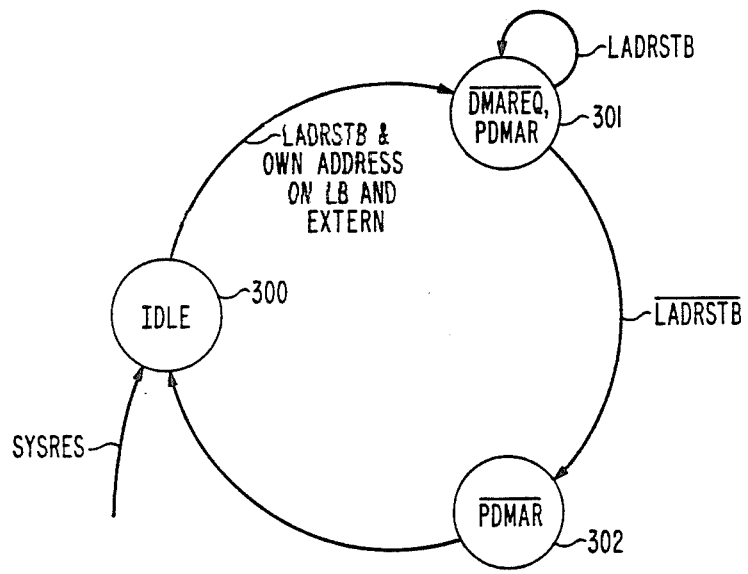
FIG. 20 is a state diagram of the deadlock detector of FIG. 5.

Meanwhile, as shown in FIG. 20, the deadlock detector 47 is in its IDLE state 300, monitoring the local bus 21 to determine if the station 22 is being addressed over the local bus 21. The presence of a valid address of the block 1002 of addresses dedicated to the station 22 on the local bus 21, indicates that the station 22 is being accessed over the local bus 21. Validity of the address is indicated by the LADRSTB lead being asserted. Should this condition occur while the EXTERN lead is also asserted, that is, while the station 22 is attempting to access the local bus 21, deadlock results and is detected by the deadlock detector 47. Deadlock may occur at any time until the LB master 38 receives the LBACK signal. Upon the receipt of that signal, the station 22 becomes the master of the local bus 21, and therefore deadlock cannot occur at the station 22. Deadlock can then occur only at the other station 22 which is being accessed over the local bus 21 by the station 22 of FIGS. 4 and 5.

Assuming that deadlock is not detected by the deadlock detector 47, the detector 47 remains in its IDLE state 300. Referring to FIG. 18, upon receipt of the LBACK signal, the LB master 38 goes to state 202 in which it causes, via the LBI 35, the MA to become interfaced to the ADDR/DATA bus of the local bus 21 and the address present on the MA to be transferred onto the ADDR/DATA bus. The details of implementing the circuitry to accomplish the connection of the buses are within the scope of knowledge of the art. The LB master 38 also asserts in the state 202 the LADRSTB line to indicate to the addressed station 22 the validity of the address on the local bus 21, and awaits the assertion of the LADRRACK line by the addressed station 22 acknowledging that the addressed station 22 received and recognizes the address.

Upon receipt of the LADRACK signal the LB master 38 checks the state of the R/W line of the micro bus 36 to determine if a "read" or a "write" operation is being performed and makes sure that all is ready for the transfer of data by checking the assertion of the DS line. If the operation is a "read", the LB master 38 goes to state 203. In the state 203 the LB master 38 indicates a "read" to the slave station 22 by proper assertion of the LBR/W line, causes, via the LBI 35, the MD bus to become interfaced to the ADDR/DATA bus of the local bus 21, and asserts the LDATSTB line to indicate readiness to receive data. It then awaits receipt of the LDATACK signal.

However, if the operation is a "write", the LB master 38 goes to state 204. In the state 204 the LB master 38 indicates a "write" to the bus slave station 22 by proper assertion of the LBR/W line, causes, via the LBI 35, the MD bus to become interfaced to the ADDR/DATA bus of the local bus 21, and asserts the LDATSTB line to signal to the bus slave station 22 the validity of the data on the ADDR/DATA bus. It then awaits receipt of the LDATACK signal. Once again, the details of implementing the circuitry to accomplish the connection of the buses are within the scope of knowledge of the art.

Upon completion of the interface of the ADDR/DATA bus with the MD bus and the transfer of data between the stations 22, as indicated by the assertion of the LDATACK line, by the slave station 22, the LB master 38 goes from either state 203 or state 204 to state 205, in which it asserts the DTACK line to the MBC 26 and waits for removal of the DS signal.

The MBC 26 and the CPU 25 respond to the DTACK signal from the LBC/I 34 in the same manner as they responded to the DTACK signal from the devices 32-33, as shown in FIG. 17 and described above. When the MBC 26 deasserts the DS line in state 105, the LB master 38 responds by going to state 207 (see FIG. 18) in which it deasserts the DTACK and LDATSTB lines and awaits a determination of whether an "interlock" instruction is in progress.

If this is an interlocked instruction, the MBC 26 reasserts in state 102 (see FIG. 17) the DS line while the CPU 25 changes state of the R/W line to indicate the "write" portion of the interlocked instruction. As shown in FIG. 18, the LB master 38 responds by going to state 204, where it performs the "write" operation, and returns by way of the state 205 to the state 207, as described above.

If only a simple "read" or "write" operation was being performed, and following the completion of the "write" portion of the "interlock" operation, the MCB 26 deasserts the PAS line in state 104 (see FIG. 17). The MBC 26 then responds to the loss of the DTACK signal as before returning to its IDLE state 100 to place the PAS and the DS lines in the Tri-state level. The address decoder 31 (see FIG. 5) responds to the loss of the PAS signal by deasserting the EXTERN line.

The loss of the EXTERN signal causes the LB master 38 to move from the state 207 to state 206 (see FIG. 18) in which it deasserts the LBREQ, and LADRSTB lines and disconnects the microbus 36 from the local bus 21, thus freeing both buses. The LB master 38 then returns to its IDLE state 200.

Access to the station 22 from the local bus 21 without deadlock is described next.

When the station 22 of FIGS. 4 and 5 is being accessed over the local bus 21 by one of the other stations 22, the station 22 of FIGS. 4 and 5 is informed of this condition by the appearance of a valid address from its dedicated block 1002b-q on the local bus 21. The address' validity indicated by the assertion of the LADRSTB line. Because deadlock is assumed to not be occurring, the EXTERN line is not asserted and hence the deadlock detector 47 remains in its idle state 300 (see FIG. 20).

Figure 19:
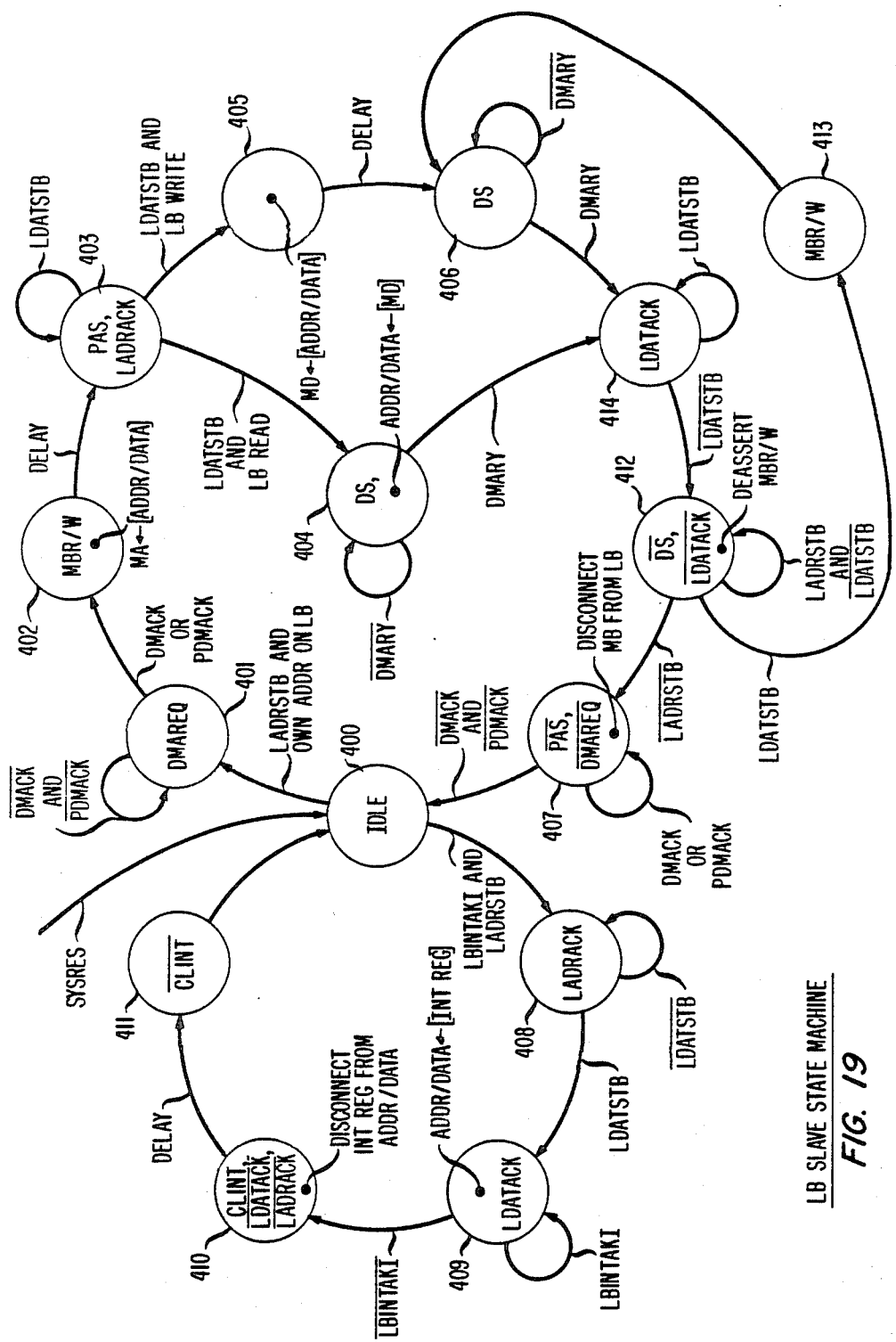
FIG. 19 is a state diagram of the local bus slave of FIG. 5.

Turning to FIG. 19, when the LB slave 39 detects the address from its station's dedicated block 1002b-q on the on the local bus 21 and the assertion of the LADRSTB line, it leaves its IDLE state 400 and goes to state 401 in which it asserts the DMAREQ (direct memory access request) line and waits for a DMACK (direct memory access acknowledge) or a PDMACK (preemptive direct memory access acknowledge) signal.

As shown in FIG. 17 and described above, the MBC 26 responds to the DMAREQ line only when it is in the IDLE state 100. If the CPU 25 is communicating with the devices 32-33 and hence the MBC 26 is not in the IDLE state 100, the LB slave 39 must wait for the CPU 25 to finish its communications and for the MBC 26 to return to the IDLE state 100.

When the MBC 26 is in the IDLE state 100, it responds to the assertion of the DMAREQ line by going to the state 113, in which it asserts the BUFEN line. This causes the buffers 28-30 to become disabled, thus disconnecting the CPU 25 from the microbus 36. In the state 113, the MBC 26 also becomes nonresponsive to the assertions of the CPUAS and CPUDS lines by the CPU 25. However, the CPU 25 is not aware of having been disconnected from the microbus 36. The disconnection is transparent to the program under whose control the CPU 25 is operating. Hence, if the CPU 25 wishes to initiate communications while disconnected from the microbus 36, it may do so. But the communications will be blocked by the disabled buffers 28-30 and by the MBC 26. Thus, the CPU 25 will not receive a CPURY signal, and it will sit idle, paused in its communications, until the MBC 26 reconnects it to the microbus 36 and allows its communications to continue. As can be seen, therefore, access by one station 22 of another station 22 is passive, not involving the intelligence of the accessed station 22 in the carrying out of the access.

Having disconnected the CPU 25 from the micro bus 36, the MBC 26 also asserts the DMACK line in the state 113, and then awaits the assertion of the DTACK line.

Returning to FIG. 19, the LB slave 39 responds to the assertion of the DMACK line by moving to state 402, in which it causes, via the LBI 35, the ADDR/DATA bus of the local bus 21 to become interfaced to the MA bus, and the least significant bits of the address from the local bus 21 to be transferred to the MA bus. The bits of the address which designate the station 22 which is being addressed are stripped off, for example for being masked, and are not transferred to the MA bus. Thus only the address of the element in the common block 1002a is transferred to the MA bus. Once again, details of the implementation of the circuitry to accomplish these operations, and the below-described interfacing of the ADDR/DATA bus of the local bus 21 to the MD bus, lie within the scope of knowledge of the art.

At this time, the LB slave 39 also examines signals on the LBR/W line of the local bus 21 to determine whether a "read" or a "write" operation is indicated, and outputs the appropriate signal onto the R/W line of the microbus 36.

Following a delay to allow the address signals to become settled on the MA bus, the LB slave 39 goes to the state 403 in which it asserts the PAS line, causing the devices 32-33 to examine the address on the MA bus to determine which one of them is being designated the microbus slave in this operation. The LB slave 39 also asserts the LADRACK line to acknowledge the receipt of the address over the local bus 21. The LB slave 39 then awaits the assertion of the LDATSTB line by the local bus master.

The common block 1002a address which is now present on the MA bus is generally recognized by the device being addressed thereby, which readies itself for the carrying out of an operation. But in the case of a "dumb" device, the address decoder 31 (see FIG. 5) recognizes the address and asserts the appropriate SEL line or lines to ready the "dumb" device to carry out the operation, as was discussed above.

When an LDATSTB signal is received and a "read" operation is indicated by the state of the LBR/W line, the LB slave 39 goes to state 404 in which is causes, via the LBI 35, the ADDR/DATA bus of the local bus 21 to become interfaced to the MD bus for transfer of data from the MD bus onto the ADDR/DATA bus. In the state 404, the LB slave 39 also asserts the DS line. It then awaits assertion of the DMARY (direct memory access reply) line.

When an LDATSTB signal is received and a "write" operation is indicated by the state of the LBR/W line, the LB slave 39 goes from the state 403 to state 405 in which it causes, via the LBI 35, the ADDR/DATA bus of the local bus 21 to become interfaced to the MD bus and data to become transferred from the ADDR-/DATA bus onto the MD bus. Following a delay to allow the data signals on the MD bus to settle, the LB slave 39 goes to state 406 in which is asserts the DS line. It then awaits assertion of the DMARY line.

The device 32-33 which has been selected as the microbus slave responds to the DS and R/W line signals by reading data onto the MD bus or writing data from the MD bus, depending on whether a "read" or a "write" operation, respectively, is indicated. To signal completion of its part of the operation, the addressed device either asserts the DTACK line, or the wait state generator 48 of the MBC 26 issues a timeout signal on behalf of a "dumb" device.

Referring to FIG. 17, the MBC 26 responds to the DTACK or timeout signal by going to state 114 and asserting the DMARY line. It then waits for the deassertion of the DTACK line.

Returning now to FIG. 19, the LB slave 39 responds to the assertion of the DMARY line by leaving the state 404 or the state 406 and going to state 414, in which it asserts the LDATACK line to signal the bus master that the data has been sent or received. The LB slave 39 then awaits the deassertion of the LDATSTB line by the local bus master. The LB slave 39 responds to the deassertion of the LDATSTB line by going to state 412 in which it deasserts the LDATACK line, the DS line, and the MBR/W line, and awaits a determination of whether an "interlock" operation is in progress.

In the meantime, deassertion of the DS line causes the selected slave device to deassert the DTACK line, causing the associated MBC 26 to go to state 116 in which it deasserts the DMARY line and then awaits the deassertion of the DMAREQ line or the reassertion of the DTACK line.

If an "interlock" operation is in progress, the local bus master changes the state of the LBR/W line, places data on the ADDR/DATA bus, and reasserts the LDATSTB line to carry out the "write" portion of the "interlock" operation, as was discussed above. As the ADDR/DATA bus and the MD bus are still interconnected, the data passes from the ADDR/DATA bus onto the MD bus, and the LB slave 39 responds to the reassertion of the LDATSTB line by going to state 413 in which it asserts the MBR/W line to indicate a "write" operation. The LB slave 39 then goes to the state 406 to assert the DS line and await the assertion of the DMARY line, as was discussed above.

Receipt of the data and of the DS signal by the designated slave device once more causes it to assert the DTACK line in acknowledgement, or causes the wait state generator 48 to time out, sending the MBC 26 from the state 116 back to the state 114 to assert the DMARY line, as shown in FIG. 17. Returning to FIG. 19, the assertion of the DMARY line causes the LB slave 39 to assume the state 414 and to assert the LDATACK line. The local bus master eventually responds by deasserting the LDATSTB line, as was described above, sending the LB slave 39 into state 412 to deassert the LDATACK, the R/W, and the DS lines.

As before, the loss of the DS signal causes the slave device to deassert the DTACK line, once more forcing the MBC 26 into the state 116 to deassert the DMARY line.

Following a simple "read" or "write" operation, or following the "write" portion of an "interlock" operation, the local bus master deasserts the LADRSTB line, and the LB slave 39 responds thereto by going from the state 412 to state 407, in which it deasserts the PAS and the DMAREQ lines and disconnects the local bus 21 from the microbus 36.

Referring to FIG. 17, the MBC 26 responds to the deassertion of the DMAREQ line by going to state 115 in which it deasserts the DMACK line, and also deasserts the BUFEN line, to again enable the buffers 28–30 and thus to reconnect the CPU 25 to the microbus 36. The MBS 26 then resumes the IDLE state 100, and again becomes responsive to the assertions of the CPUAS and CPUDS lines by the CPU 25.

As shown in FIG. 19, the deassertion of the DMACK line causes the LB slave 39 to reassume its IDLE state 400. The local bus 21-to-station 22 transaction is thus completed.

As was mentioned above, deadlock occurs when an attempt is made to access the station 22 from the local bus 21 while the station 22 is attempting to access the local bus 21. Assuming that the CPU 25 is accessing the local bus 21, the access proceeds in the manner that was described above in conjunction with FIGS. 17 and 18, up to the point of assertion of the EXTERN lead. Hence, the MBC 26 is in the state 102, asserting the PAS and DS lines, as shown in FIG. 17, and the LB master 38 is in state 201, asserting the LBREQ line, as shown in FIG. 18. Likewise, the access from the local bus 21 to the station 22 proceeds in the manner described above in conjunction with FIG. 19, to the point where the LB slave 39 is in the state 401, asserting the DMAREQ line, as shown in FIG. 19.

Turning now to FIG. 20, at this point the deadlock detector 47 detects deadlock by sensing an address associated with the station 22 on the local bus 21 while sensing that the EXTERN line and the LADRSTB line are asserted. The deadlock detector 47 responds to the deadlock condition by going from its IDLE state 300 to the state 301, deasserting the DMAREQ line (which was previously asserted by the LB slave 39), and asserting in its stead the PDMAR (preemptive direct memory access request) line.

The MBC 26 responds to the detection of deadlock by resolving the deadlock: it gives preference to the access of the station 22 of FIGS. 4 and 5 from the local bus 21 and pauses, holds in abeyance, the attempt by the station 22 of FIGS. 4 and 5 to access the local bus 21.

Referring to FIG. 17, the MBC 26 responds to the assertion of the PDMAR line by going from the state 102 to state 106. In the state 106, the MBC 26 asserts the DS and PAS lines. It then goes to state 107 where it asserts the BUFEN line, thus disconnecting the CPU 25 from the microbus 36 and placing the MA and MB buses and the R/W line in the Tr-state level. In the state 107, the MBC 26 also places the DS and PAS lines in the Tri-state level. Thus the microbus 36 becomes initialized and ready to be interfaced to the local bus 21 to complete the local bus 21-to-station 22 access. Following a delay to allow the state of the microbus 36 to settle, the MBC 26 goes to state 108 and asserts the PDMACK line.

As in the case of the local bus 21-to-station 22 access without deadlock, the CPU 25 is not aware of having been disconnected from the microbus 36. The disconnection is transparent to the program under whose control the CPU 25 is operating. Further progress of the communication of the CPU 25 is paused, and the CPU 25 is merely forced to wait for a CPURY signal longer than usual. The CPU 25 must wait until the local bus 21-to-station 22 access is completed, at which time the CPU 25 is reconnected to the microbus 36 and the paused communication is resumed from the point at which it was paused. Again, the access of the station 22 of FIGS. 4 and 5 by another station 22 is passive.

Because the address that had been output by the CPU 25 onto the MA bus has been removed therefrom by the initialization of the micro bus 36, the address decoder 31 deasserts the EXTERN line. This does not affect the state of the deadlock detector 47 or of the LB master 38 because neither is in its respective IDLE state and hence neither is monitoring the EXTERN line at this time. (See FIGS. 18 and 20). Rather, the deadlock detector 47 continues to monitor the local bus 21 for the presence of the LADRSTB signal, which indicates that the station 22 continues to be accessed, and the LB master 38 continues to assert the LBREQ line. But because the local bus 21 is occupied, being used in the access of the station 22, the LB master 38 does not receive an LBACK signal until the access of the station 22 is completed.

Turning to FIG. 19, the LB slave 39 responds to the assertion of the PDMACK line in the same manner in which it was previously described to have responded to the assertion of the DMACK line, and executes the "read" or "write" or "interlock" access from the local bus 21 to the station 22, finally reaching either the state 404 or the state 406 in which it awaits the receipt of the DMARY signal.

When the accessed device responds to the access by asserting the DTACK line, or when the wait state generator 48 of the MBC 26 times out on behalf of a "dumb" device, the MBC 26 goes from the state 108 to state 109 and asserts the DMARY line, as shown in FIG. 17. As described before, the LB slave 39 responds by going to the state 414 and asserting the LDATACK line, provoking the local bus master to deassert the LDATSTB line, and causing the LB slave 39 to assume the state 412 in which it deasserts the LDATACK, DS, and R/W lines of the microbus 36, as shown in FIG. 19.

The accessed device responds to the loss of the DS signal by deasserting the DTACK line, causing the MBC 26 to go from state 109 to state 117 in which it deasserts the DMARY line and then awaits reassertion of the DTACK line, as during an "interlock" operation, or deassertion of the PDMAR line.

Upon completion of the access of the station 22 from the local bus 21, the LADRSTB line is deasserted in the state 206 by the LB master 38 of the local bus master, as shown in FIG. 18, resulting in the LB slave 39 of the local bus slave going from the state 412 to state 407, in which it deasserts the PAS and DMAREQ lines and disconnects the microbus 36 from the local bus 21, as shown in FIG. 19.

Turning to FIG. 20, the loss of the LADRSTB signal is sensed by the deadlock detector 47, which responds by going to state 302 and deasserting the PDMAR line. The detector 47 then returns to its IDLE state 300.

Deassertion of the PDMAR line causes the MBC 26 to go to from the state 117 to state 110 to deassert the PDMACK line, as shown in FIG. 17. The LB slave 39 responds to the loss of the PDMACK signal in the same manner as it responded to the loss of the DMACK signal, by returning to its IDLE state 400 (see FIG. 19). The local bus 21-to-station 22 access is thus fully completed.

Referring again to FIG. 17, following deassertion of the PDMACK line, the MBC 26 goes to state 111 and deasserts the BUFEN line, thus turning on the buffers 28–30 and reconnecting the CPU 25 to the microbus 36. Assuming that the communication of the CPU 25 which was paused by the deadlock condition is still pending, the R/W line and the MA and MD buses take on values corresponding to those being output by the CPU 25 and following a delay allowing the state of those values to settle, the MBC 26 returns to the IDLE state 100. But if, as was assumed, the paused communication of the CPU 25 is still pending, then both lines CPUAS and CPUDS are asserted, and so the MBC 26 immediately passes from the state 100 through the state 101 and to the state 102, asserting the PAS and DS lines. The condition of the microbus 36, is now the same as it was at the time of the detection of the deadlock, and the communication of the CPU 25 resumes at the point where it left off.

Unlike the memory and peripherals 32, the DMA peripherals 33 are also capable of initiating communications in the system 20. When a DMA peripheral 33 wishes to communicate on the microbus 36, for example for the purpose of accessing the memory and peripherals 32 or for the purpose of accessing the local bus 21, it asserts the DMAREQ line. Referring to FIG. 17, the MBC 26 responds to the DMAREQ signal only when it is in the IDLE state 100, as was explained above. The MBC 26 leaves the IDLE state 100 in response to the assertion of the DMAREQ line and goes to state 113, in which it disconnects the CPU 25 from the microbus 36 to free the microbus 36 for use by the DMA peripheral 33. The MBC 26 then asserts the DMACK line.

Figure 14:
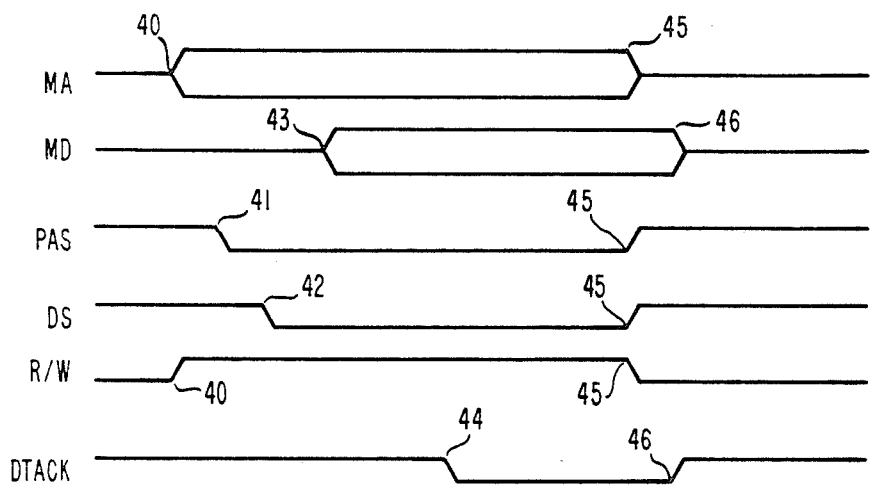
FIG. 14 is a timing diagram of the basic "read" protocol of the microbus of the station of FIGS. 4 and 5.
Figure 15:
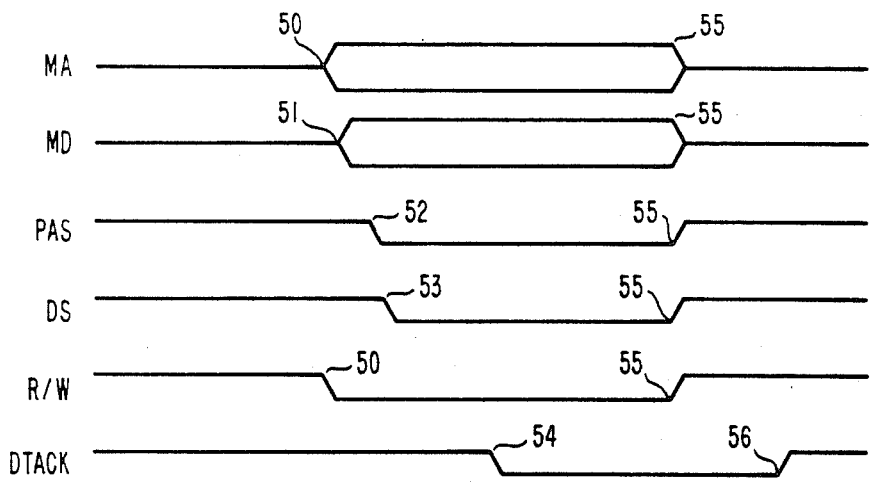
FIG. 15 is a timing diagram of the basic "write" protocol of the microbus of the station of FIGS. 4 and 5.
Figure 16:
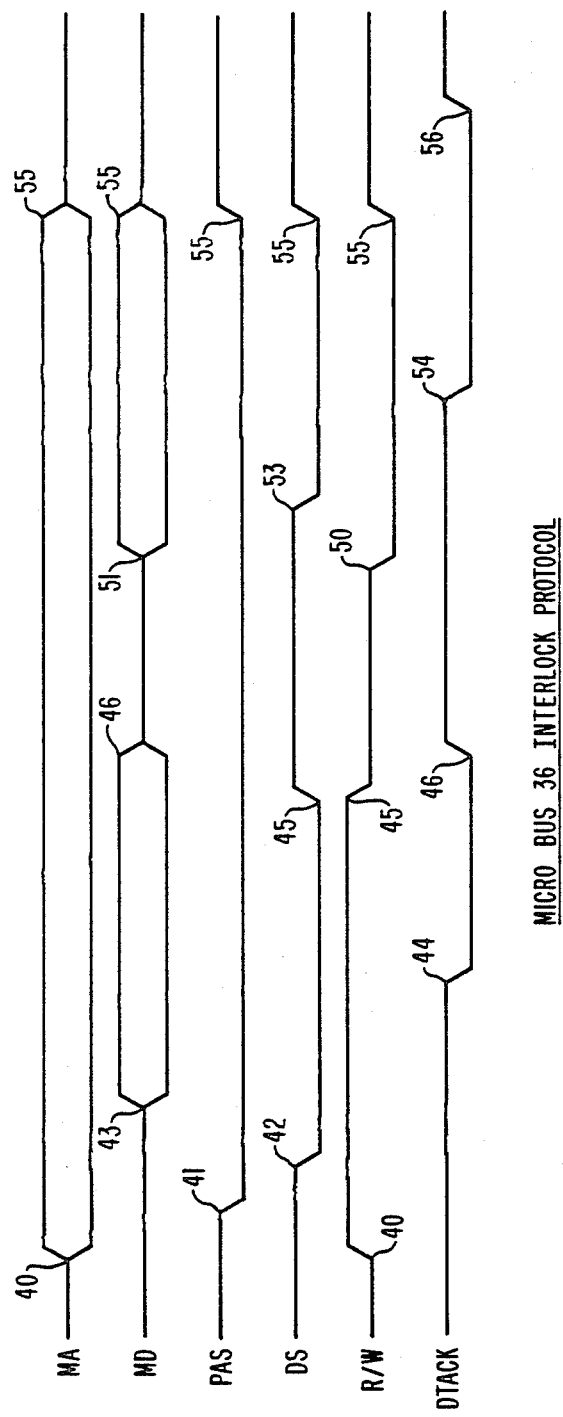
FIG. 16 is a timing diagram of the basic "interlock" protocol of the microbus of the station of FIGS. 4 and 5.

When the DMA peripheral 33 receives the DMACK signal, it proceeds to communicate on the microbus 36 according to the protocol of FIGS. 14 through 16. If the address output by the DMA peripheral 33 is an off-station 22 address, the address decoder 31 detects this condition and asserts the EXTERN line.

If a deadlock condition does not result when the EXTERN line is asserted, the LB master 38 interfaces the communications of the DMA peripheral 33 to the local bus 21 in the manner shown in FIG. 18 and described above. In the process, the MBC 26 makes a transition to the states 114 and 116, as shown in FIG. 17. When the communication is finished, the DMA peripheral 33 deasserts the DMAREQ line, causing the MBC 26 to go to state 115 in which it deasserts the DMACK line and reconnects the CPU 25 to the microbus 36. The MBC 26 then returns to its IDLE state 100.

If the communication attempted by the DMAR peripheral 33 does result in a deadlock, however, the deadlock detector 47 detects the condition in the manner described above, and goes from the IDLE state 300 to the state 301 where it deasserts the DMAREQ line and asserts the PDMAR line. (See FIG. 20).

As the MBC 26 is in the state 113 (See FIG. 17), it is not monitoring the PDMAR and DMAREQ lines, so it does not respond to the deadlock condition. But a response from the MBC 26 is not required, as the CPU 25 is already disconnected from the microbus 36. However, the DMA peripheral 33 is monitoring the PDMAR line, and when it detects that the PDMAR line has been asserted, it resets itself, canceling its attempt at communication and releasing the microbus 36. The DMA peripheral 33 not only deasserts the MD and MA buses and the R/W, the PAS, and DS lines, but also deasserts the DMAREQ line. Thus, the DMA peripheral 33 assumes the condition it was in before attempting the communication, and becomes available for access from the local bus 21 should it be selected as the microbus slave.

Because the MBC 26 is in the state 113 (see FIG. 17), it is asserting the DMACK line. Therefore, the local bus 21-to-station 22 communication is enabled to proceed in the manner shown in FIG. 19 and described above.

When the LB slave 39 is in the state 404 and 406 and the selected microbus slave asserts the DTACK line to acknowledge that it has completed reading or writing data, or the wait state generator 48 times out, the MBC 26 responds by going to state 114 and asserting the DMARY line (see FIG. 17) to signal that acknowledgement to the LB slave 39. As shown in FIG. 19 and described previously, the LB slave 39 responds to the DMARY signal by going to the state 414 in which it deasserts the LDATACK line and brings about the deassertion of the LDATSTB line. This in turn causes the LB slave 39 to assume the state 412 and to deassert the LDATACK line, and the DS and R/W lines of the microbus 36, resulting in the deassertion of the DTACK line and hence movement of the MBC 26 to the state 116, all as shown in FIGS. 17 through 19 and described previously.

As was described in conjunction with FIG. 18, the completion of the operation brings about the deassertion of the LADRSTB line, bringing the LB slave 39 into the state 407 in which it deasserts the PAS and DMAREQ lines and disconnects the microbus 36 from the local bus 21.

Referring again to FIG. 17, in the state 116 the MBC 26 again becomes responsive to the status of the DMAREQ line. Because the DMAREQ line is deasserted, the MBC 26 goes to the state 115. In the state 115 the MBC 26 deasserts the DMACK line and reconnects the CPU 25 to the microbus 36 by deasserting the BUFEN line. The MBC 26 then returns to the IDLE state 100.

Turning back to FIG. 19, the LB slave 39 responds to the deassertion of the DMACK line by returning to its IDLE state 400. The transaction is thus completed.

When the LB master 38 of the local bus master deasserts the LADRSTB line, in the state 206 (see FIG. 18), causing the LB slave 39 of the local bus slave to disconnect the microbus 36 from the local bus 21 in the state 407 (see FIG. 19), the transaction is completed from the viewpoint of the local bus 21. Referring to FIG. 20, the loss of the LADRSTB signal is sensed by the deadlock detector 47, which goes to the state 302, deasserts the PDMAR line, and returns to the IDLE state 300.

When the PDMAR line is deasserted, the DMA peripheral 33 is free to reattempt its communication. Having been reset as a result of the deadlock condition, however, the DMA peripheral 33 must start from scratch, by asserting the DMAREQ line and awaiting receipt of a DMACK signal.

In light of the understanding of the communication protocol of the multiprocessor system 20 of FIG. 2 in general and of the station 22 of FIGS. 4 and 5 in particular, the configuration and functionality of the station 22 of FIGS. 4 and 5 and its interaction with other stations 22 of the system 20 will be discussed in greater detail.

Figure 6:
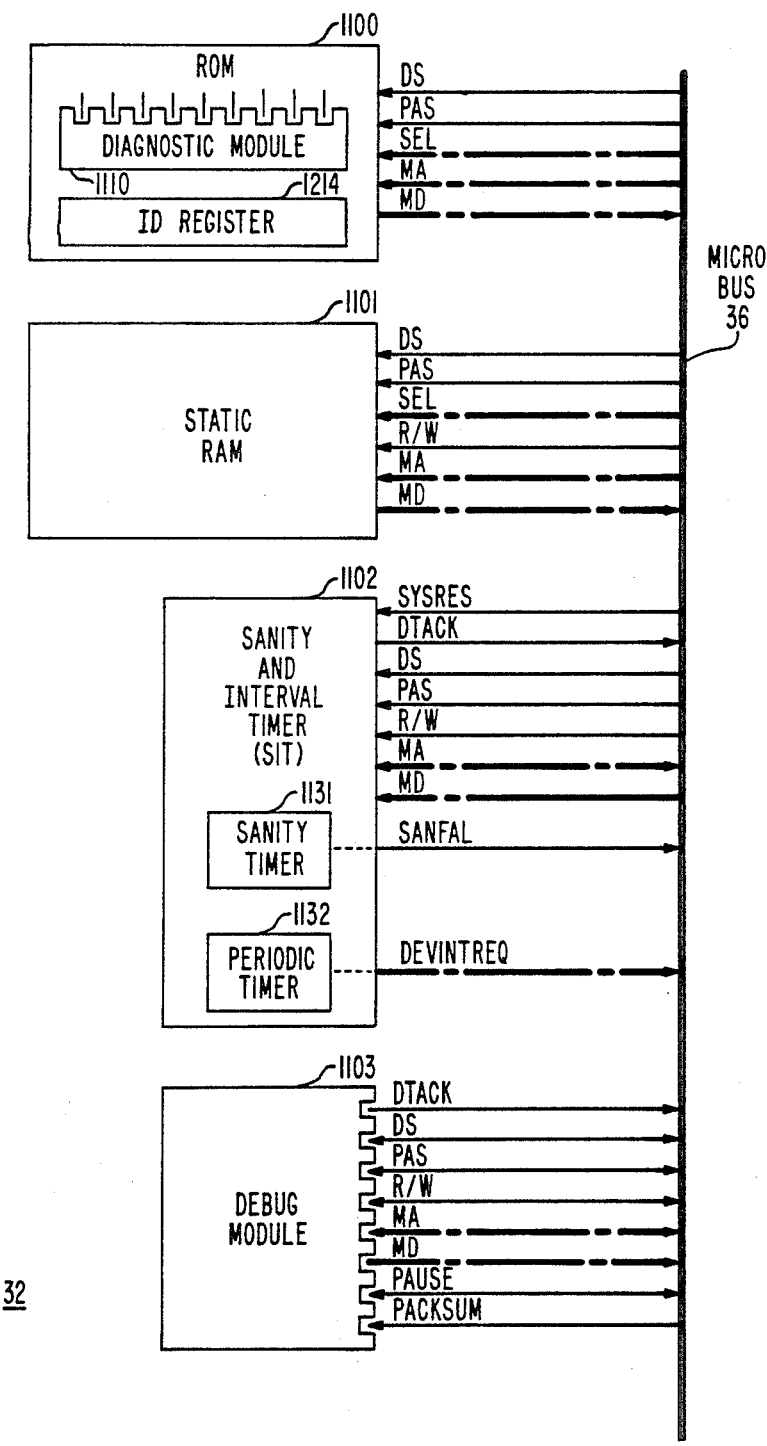
FIGS. 6 through 8 together form a block diagram of memory and peripherals of the station of FIGS. 4 and 5.
Figure 7:
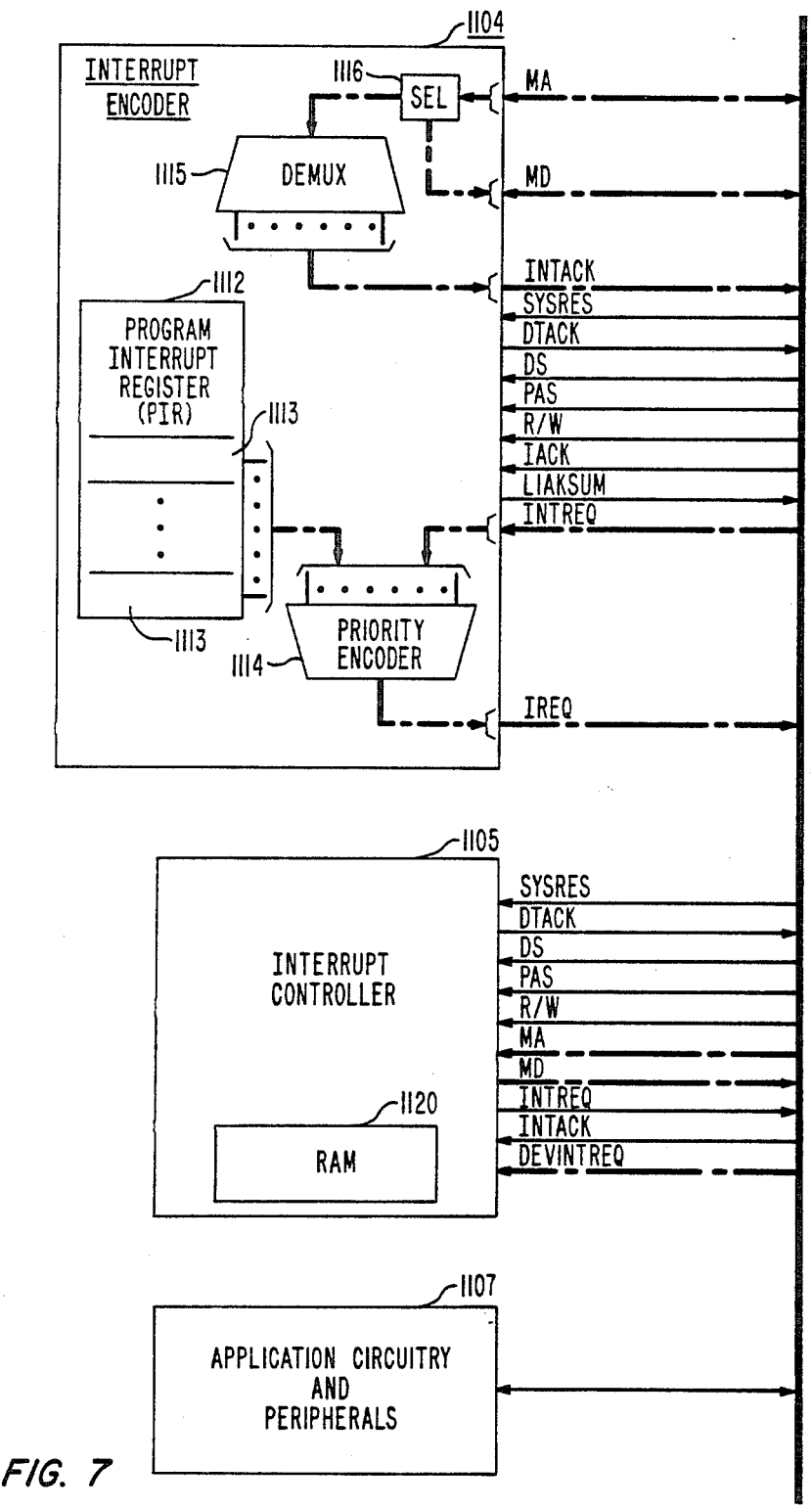
Figure 8:
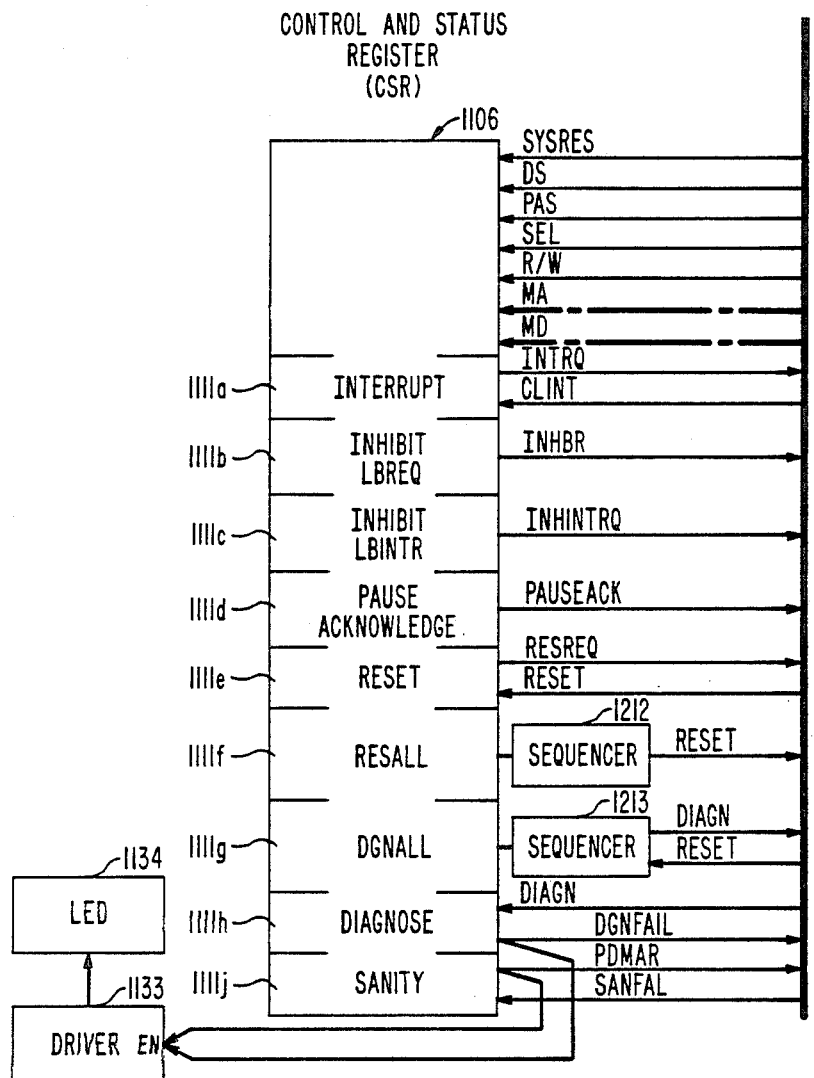

Turning now to FIGS. 6 through 8, they diagram in block form the memory and peripherals 32 of FIG. 4.

In FIGS. 6 through 8, the memory and peripherals 32 are shown to include a read only memory (ROM) 1100, a static random access memory (RAM) 1101, a sanity and interval timer (SIT) 1102, a debug module 1103, an interrupt encoder 1104, an interrupt controller 1105, a control and status register (CSR) 1106, and assorted application circuitry and peripherals 1107.

Each station 22 includes devices and programs which customize the station 22 for its particular application. Application devices which are capable of direct memory access are included in the DMA peripherals 33. Other application circuitry and peripherals are included in the application circuitry and peripherals 1107 of the memory and peripherals 32, shown in FIG. 7.

The application circuitry and peripherals 1107 of each station 22 depend upon the application to which the station 22 is being put. Application of a station 22 to a particular function is within the skill of the art. Therefore the application circuitry and peripherals 1107 will not be discussed here except in passing. The application circuitry and peripherals 1107 are connected to the various lines and buses of the micro bus 36 as necessary.

The ROM 1100, shown in FIG. 6, holds the programs which the CPU 25 of the station 22 need execute. The ROM 1100 contains software which is common to all of the stations 22, such as the operating system software, as well as the station's application software.

The ROM 1100 is comprised of a plurality of memory modules (not shown), which include a diagnostic module 1110. The diagnostic module 1110 holds diagnostic programs which the CPU 25 may be requested to execute in order to check out the operational status of various parts of the station 22. Diagnostic programs are known to the art. In the case of an intelligent station 22, its own CPU 25 generally executes the diagnostic programs to diagnose the station 22. However, the CPUs 25 of other intelligent stations 22 are capable of accessing, via passive access, the diagnostic module 1110 of the one station 22 and executing the diagnostic programs on its behalf. This may become necessary, for example, if the CPU 25 of the station 22 becomes disabled. In the case of a passive station 22 which does not have its own CPU 25, the CPU 25 of some intelligent station 22, for example of the central controller 22a, must access and execute the station's diagnostic programs to diagnose the passive station 22.

As shown in FIG. 6, the diagnostic module 1110 is a plug-in module. The plug-in capability makes the diagnostics of a station 22, and hence of the system 20, easily changeable or modifiable in the field, via the simple expedient of unplugging one module 1110 and plugging in its place another module 1110. The ROM 1100 includes a storage location referred to as identification (ID) register 1214 which holds the ID, i.e., information which uniquely identifies, the station 22. The contents of the ID register 1214 are, naturally, application-dependent. Alternatively, the ID register 1214 may be a hardwired register separate from the ROM 1100 and connected to the microbus 36. The ID register 1214 of each station 22 may be passively accessed by an intelligent station 22. An intelligent station 22 which is designated by its software to configure the system 20, for example the central controller 22a, may access and read out the contents of the ID registers 1214 of all stations 22 of the systems 20 at some appropriate time, for example following system reset and upon system initialization, to determine the number and the type, or identity, of stations 22 included in the system 20, for the purpose of automatically configuring the system 20.

The ROM 1100 is connected to the MA and MD buses and the PAS and DS lines of the micro bus 36 for passive access. As the ROM 1100 is a read only memory, it requires no connection to the R/W line. As the ROM 1100 is a "dumb" device, selection of a module of the ROM 1100 is made by SEL (select) lines, the appropriate one of which is asserted by the address decoder 31 (see FIG. 4) upon seeing an address associated with that module on the MA bus, as was discussed previously. The static RAM 1101, shown in FIG. 6, is a scratch pad memory for use by the CPU 25 of the station 22. The static RAM 1101 is connected to the MA and MD buses and the PAS, DS and R/W lines of the microbus 36 for passive access. Like the ROM 1100, the RAM 1101 is also a "dumb" memory device comprised of a plurality of memory modules, selection of any one of which is made by the SEL lines of the microbus 36.

The control and status register (CSR) 1106 is shown in FIG. 8. It is a storage device which contains a collection of hardware status and control indicators. Some are hardware detected failure indicators, while others control various hardware modes as appropriate for diagnostic, fault recovery, and operational software. The CSR 1106 comprises a plurality of bits 1111 which serve as the indicators. Specific bits 1111 are set and cleared by hardware, either directly through dedicated control lines, or under software control through passive access, to enable system software to determine the nature of conditions existing within the station 22. The state of each bit 1111 appears on a dedicated output line. The contents of the CSR 1106 can also be read out via passive access. The functions of some of the bits 1111 of the CSR 1106 are common to all stations 22, while the uses of other bits 1111 are application dependent. Specific uses of some of the bits 1111 of the CSR 1106 are discussed further below in conjunction with the treatment of functions which they support.

For purposes of passive access, the CSR 1106 is connected to the MA and MD buses and to the PAS, DS, R/W and SEL lines of the microbus 36.

Shown in FIG. 6, the debug module 1103 contains software which is used to pinpoint faults in the station 22 and elsewhere on the local bus 21. The module 1103 also contains hardware which supports the debug program and provides facilities which the debug program needs for execution. Debug programs and apparatus are known to the art.

The debug module 1103 is also a plug-in module, as shown in FIG. 6. The plug-in capability makes the debug apparatus and software easily changeable and modifiable in the field, via the simple expedient of unplugging one module 1103 and plugging in its place another module 1103. Furthermore, the debug module 1103 need not be permanently retained in the station 22, but may be plugged in or removed as need. The debug module 1103 may be moved from station 22 to station 22, so that each station 22 need not have its own dedicated debug module. Via passive access the debug module 1103 may reach and debug any part of the system 20 from any station 22.

Connections of the debug 1103 to the microbus 36 include the MA and MD buses and the PAS, DS, R/W, and DTACK lines required for passive access.

The debug module 1103 is also connected to a PAUSE line and a PACKSUM (pause acknowledge sum) line. These lines are used for test and diagnostics purposes. They implement within the microprocessor system 20 the capability of freezing the state of the microprocessor system 20, and of the multicomputer system 17 if the microcomputer system 20 is not a standalone system, at any point in time so that the state of the microprocessor system 20 or of the multicomputer system 17 at that time may be examined by the debug module 1103. The PAUSE line is connected to a DEVINTREQ (device interrupt request) input of the interrupt controller 1105 (see FIG. 7). The PAUSE line is also routed through the LBC/I 34 to the local bus 21, where it connects to the LPAUSE (local bus pause) line.

The PAUSE lines of all stations 22 within a multiprocessor system 20 are bidirectional and connect to the LPAUSE line. In the multicomputer system 17 (see FIG. 1) the LPAUSE line is also routed through the system bus interface 19 via the system bus 18 to connect with the LPAUSE lines of all multiprocessor systems 20 in the multicomputer system 17. Assertion by any debug module 1103 within the system 17 of the PAUSE line causes an assertion of all LPAUSE, and hence of all PAUSE, lines in the system 17, thus asserting a DEVINTREQ line at each station's interrupt controller 1105 to signal an interrupt request. Thus an interrupt is generated throughout the system 17 by the assertion of any PAUSE line.

The interrupt is handled by the CPU 25 at each station 22. The CPU 25 responds to the interrupt by freezing, under software control, the state of its station 22. The interrupt so generated is of the highest level to cause each station 22 to accept and process it immediately, thus stopping the operation of all stations 22 substantially immediately, at substantially the same time. The CPU 25 acknowledges the freezing of the state of the station 22 by setting under software control a PAUSE ACKNOWLEDGE bit 1111d in the CSR 1106 (see FIG. 8). Setting of the PAUSE ACKNOLWEDGE bit 111d asserts a unidirectional PAUSEACK (pause acknowledge) line which is routed from the CSR 1106 through the LBC/I 34 to the local bus 21, where it connects to the LPAUSEACK (local bus pause acknowledge) line.

The PAUSEACK lines of all stations 22 within a multiprocessor system 20 connect to the LPAUSEACK line. In a multicomputer system 17 this line is routed through the system 17 to connect with the LPAUSEACK lines of all multiprocessor systems 20. All stations 22 within the system 17 must assert their PAUSEACK lines for the LPAUSEACK line to become asserted.

The LPAUSEACK line is routed back to each station 22, where it connects at the LBC/I 34 to the station's PACKSUM (pause acknowledge sum) line. The PACKSUM line connects to the station's debug module 1103 to bring acknowledgment of pause in system operation to the debug module 1103 which originated the pause request.

When the pause-requesting debug module 1103 no longer requires the multiprocessor system 20 or the multicomputer system 17 to remain in a frozen state, it deasserts the PAUSE line. This releases the LPAUSE line and deasserts the associated DEVINTREQ lines in all stations 22, removing the interrupt request. The CPU 25 of each station 22 as part of servicing the interrupt request has been monitoring that interrupt request, and when it detects the removal thereof, the CPU 25 reactivates the station 22 and clears, under software control, the PAUSE ACKNOWLEDGE bit of its CSR 1106. This causes the PAUSEACK line, and hence the LPAUSEACK and PACKSUM lines, to become deasserted. The systems returns to its normal active state and continues operation from the point at which it had paused.

Shown in FIG. 6, the sanity and interval timer (SIT) 1102 provides on-board timer facilities for the station 22. Such timers are well known to the art, and may be implemented via a microcomputer. Facilities provided by the SIT 1102 include a periodic timer 1132 and a sanity timer 1131 plus interval timers (not shown) which are user programmable and application-dependent. The interval and periodic timer 1132 outputs of the SIT 1102 are each connected to a DEVINTREQ line. When a SIT timer periodically times out, the SIT 1102 asserts the associated DEVINTREQ line to cause an interrupt in the station 22.

The sanity and interval timer 1102 timing functions become disabled, and later reenabled, under software control as part of the PAUSE function execution.

The periodic timed interrupt generated by the periodic timer 1132 supports short term, time dependent scheduling functions required by system software. Handling of the periodic timed interrupt includes resetting, under software control, of the sanity timer 1131 of the SIT 1102. For this purpose, inter alia, the SIT 1102 is connected to the MA and MD buses and the DS, PAS, DTACK, and R/W lines of the microbus 36.

The sanity timer 1131 provides a basic check on system sanity. It times a period greater than that timed by the periodic timer 1132. If the software of the station 22 lacks the basic sanity required to reset the sanity timer 1131 at least once every sanity timer period, the sanity timer 1131 times out. The sanity timer 1131 output of the SIT 1102 is connected to a SANFAL (sanity failure) line, and the timing out of the sanity timer 1131 causes this line to become asserted.

The SANFAL line connects to the input of a SANITY bit 1111j of the CSR 1106 (see FIG. 8). The SANFAL line sets the bit 1111j when it becomes asserted. The output of the SANITY bit 1111j is connected to the PDMAR line. Setting of the SANITY bit 1111j causes the PDMAR line to become asserted.

As shown in FIG. 17, assertion of the PDMAR line forces the MBC 26 to go into the state 106, irrespective of what other state the MBC 26 may have been in when the PDMAR line was asserted. From the state 106 the MBC 26 goes through the state 107 to the state 108, disconnecting the CPU 25 from the microbus 36 by asserting the BUFEN line, tri-stating the DS and PAS lines, and asserting the PDMACK line. The MBC 26 thus places the station 22 into a passive access mode, wherein the station 22 is configured substantially as a passive station 22: it may be accessed by other stations 22 over the local bus 21, to which accesses it responds as a bus slave, but is not capable of acting as a local bus master. Thus the insane station 22 is prevented from interfering with the operation of other stations 22 and with communications passing over the local bus 21. Yet the resources, devices of the insane station 22 are still made accessible for use, generally for diagnostic purposes, by other stations 22.

Additionally, the output of the SANITY bit 1111j may give an indication of a fault in the station 22, for example, to system maintenance personnel by activating a driver 1133 of a fault indicator such as an LED 1134, as shown in FIG. 6. Or the output of the SANITY bit 1111j may give an indication of a fault in the station 22 to system fault handling facilities (not shown) by asserting an error line (not shown) within the system. This line may be monitored by a system maintenance processor (not shown) which can take appropriate action upon finding the line asserted.

A further mechanism is provided in each station 22 for isolating the station 22 from the local bus 21. This mechanism does not place the station 22 in the passive mode like the PDMAR signal does. Rather, this mechanism allows any station 22 in the system 20 to disconnect any other station 22 in the system 20 from the local bus, in that the disconnected station is prevented from accessing the local bus 21 and/or from causing an interrupt in any other station 22.

Referring to FIG. 8, the CSR 1106 includes an INHIBIT LBREQ bit 1111b and an INHIBIT LBINTRQ bit 1111c. Each of these bits 1111b-c is accessible via passive access to any other station 22 in the system 20. The output of the INHIBIT LBREQ bit 1111b is connected to an INHBR (inhibit local bus request) line leading to the LBC/I 34. Setting of the INHIBIT LBREQ bit 1111b results in the INHBR line becoming asserted. The output of the INHIBIT LBINTR bit 1111c is connected to a INHINTRQ (inhibit local bus interrupt request) line, also leading to the LBC/I 34. Setting of the INHIBIT LBINTR bit 1111c results in the INHINTRQ line becoming asserted. At the LBC/I 34 of FIG. 5, the INHRB controls the assertion of the LBREQ line, whose function was discussed previously. Assertion of the INHBR line disables the LB master 38 from asserting the LBREQ line, and thus prevents the station 22 from gaining control of and accessing the local bus 21.

Similarly at the LBC/I 34 the INHINTRQ disables the assertion of the INTRQ line, whose function is described below, thus preventing the station 22 from causing an interrupt in any of the other stations 22.

The system 20 supports a multi-level multi-tier vectored interrupt structure. As part of an interrupt, a vector defining the type of interrupt and pointing to the appropriate interrupt handling routine is passed by the device requesting the interrupt, referred to herein as the interruptor, to the device being interrupted, referred to herein as the interruptee. A plurality of interrupt levels are recognized within the system 20, with each level having a different priority with respect to the other interrupt levels and with respect to program execution levels. Both hardware and software interrupts are implemented in the system 20.

Through software interrupts, any interruptor station 22 in the system 20 can interrupt the CPU 25 of any other station 22. Devices included within a station 22, for example, the DMA peripherals 33 or the SIT 1102, interrupt their station's CPU 25 via hardware interrupts. Likewise, one or more interruptor stations 22 may be wired to an interruptee station 22 for the purpose of allowing the interruptor stations 22 to cause hardware interrupts in the interruptee station 22.

The interrupt structure may be arranged in a plurality of tiers, in that an interruptor station 22 may interrupt another, interruptee, station 22, either through hardware or software, as a first tier of interrupt, which interruptee station 22 may preprocess the interrupt and then itself become an interruptor station 22 and interrupt yet a third interruptee station 22, again either through hardware or software, as a second tier of interrupt, for the purpose of passing on to the third interruptee station 22 in the preprocessed interrupt for further processing. The third interruptee station 22 may do likewise and become an interruptor station 22 with respect to a fourth interruptee station 22, and so on.

Interrupts in a station 22 are controlled by an interrupt encoder 1104, which is shown in FIG. 7. The interrupt encoder 1104 provides facilities for hardware and software to request interrupts of the CPU 25 of the station 22 and for the CPU 25 to return interrupt acknowledgments. Since the interruptee station 22 recognizes a plurality of interrupt levels, the interrupt encoder 1104 prioritizes pending interrupt requests according to their priority level an informs the CPU 25 of the highest level interrupt pending in the station 22.

For implementing the software interrupts, the interrupt encoder 1104 includes a programmable interrupt register (PIR) 1112. The PIR 1112 comprises a plurality of bits 1113, each one of which represents one of the plurality of interrupt levels. The PIR 1112 is a bit addressable register, and it is connected to the MA and MD buses and to the DS, PAS, R/W, and DTACK lines for purposes of passive access, inter alia. An interruptor station 22 desiring to interrupt the interruptee station 22 with a software interrupt accesses the PIR register 1112 of the interruptee station 22 via passive access and sets the bit 1113 corresponding to the interrupt level at which the software interrupt is to occur.

For the purposes of allowing one or more interruptor stations 22 to interrupt an interruptee station 22 via a hardware interrupt, the local bus 21 includes a plurality of line pairs, with each line pair comprising a LBINTRQ (local bus interrupt request) line and a LBINTAK (local bus interrupt acknowledge) line (see FIG. 5). The latter line is shown in FIG. 5 as comprised of a pair of separate lines LBINTAKI and LBINTAKO, for reasons that will become apparent from the discussion below. The system 20 may include a plurality of interruptee stations 22, each having one or more LBINTRQ and LBINTAK line pairs connected thereto. A station 22 may be both an interruptor with respect to an interruptee station 22 and an interruptee with respect to one or more interruptor stations 22. However, a station 22 may be either only an interruptor or on a interruptee with respect to a single LBINTRQ and LBINTAK line pair.

More than one interruptor station 22 may be connected to one LBINTRQ and LBINTAK line pair. The interruptor stations 22 are connected in parallel to the LBINTRQ line, while the LBINTAK line is daisy-chained through the interruptor stations 22. At each interruptor station 22, the LBINTAK line forms an LBINTAKI input line and an LBINTAKO output line at the LBC/I 34. The LBINTAKI line is selectively disconnected from the LBINTAKO line by an interrupt slave 49 of the LBC/I 34 (see FIG. 5), which is a state machine defined by the diagram of FIG. 21.

For purposes of implementing the station 22-to-station 22 hardware interrupts, the LBI 35 of the LBC/I 34 includes the interrupt register 1139, as shown in FIG. 5. The interrupt register 1139 includes a plurality of bits (not shown), some of which are writable via passive access, and others of which have a fixed value which is determined by a hardware strap.

The value of the fixed value bits of the register 1139 forms an identifying number of the station 22. The identifying number of each station 22 of the system 20 is different, to allow the station 20 to be distinguished from each other. The value of the writable bits of the register 1139 forms an interrupt vector. The contents of the interrupt register 1139 may be selectively read over the local bus 21.

To interrupt the interruptee station 22, the CPU 25 of the interruptor station 22 writes the writable bits of the interrupt register 1139 of its LBI 35 with the appropriate interrupt vector. The CPU 25 then sets an INTERRUPT bit 1111a, see FIG. 8, of its associated CSR 1106. Setting of the INTERRUPT bit 1111a asserts an INTRQ (interrupt request) line which leads from the bit 1111a of the CSR 1106 to the interrupt slave 49 of the LBC/I 34, (see FIG. 5).

Figure 21:
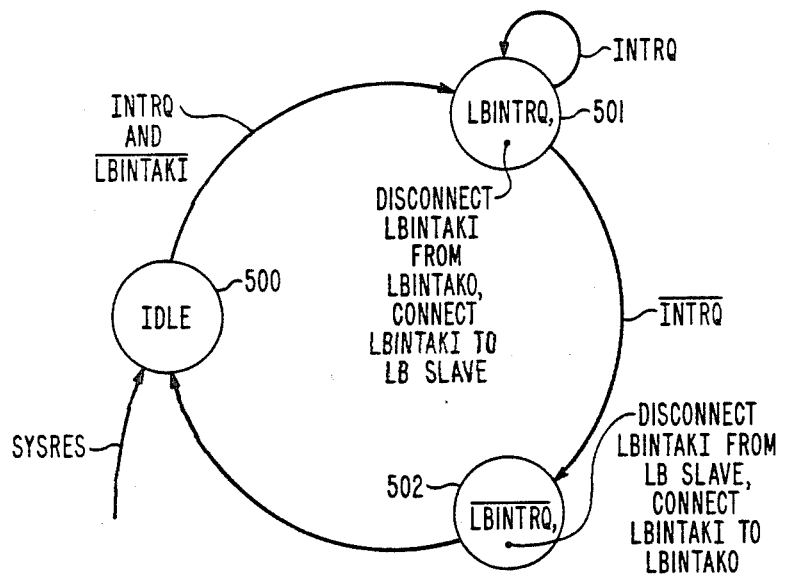
FIG. 21 is a state diagram of the interrupt slave of FIG. 5.

The state diagram of the interrupt slave 49 is shown in FIG. 21. The interrupt slave 49 is connected to the INTRQ, LBINTRQ, LBINTAKI, and LBINTAKO lines. Commonly, the interrupt slave 49 is in an idle state 500, in which it connects the LBINTAKI line to the LBINTAKO line and disconnects the LBINTAKI line from other LBC/I 34 circuitry. Assertion of the INTRQ line can be thought of as causing the interrupt slave 49 to check whether the LBITAKI line is asserted: if the LBINTAKI line is asserted, the interrupt slave 49 ignores the assertion of the INTRQ line, but when the INTRQ line becomes asserted while the LBINTAKI line is not arrested, the interrupt slave 49 makes a transition to state 501, in which it asserts the LBINTRQ line and disconnects the LBINTAKI line from the LBINTAKO line, thus causing a break in the daisy-chained LBINTAK line. In the state 501 the interrupt slave 49 also connects the LBINTAKI line to the LB slave 39. The interrupt slave 49 then awaits in the state 501 the deassertion of the INTRQ line.

At the LBC/I 34 of the interruptee station 22 the LBINTRQ line connects to an INTREQ (interrupt request) line (see FIG. 5) leading to the priority encoder 1114 (see FIG. 7). Other LBINTRQ lines from other interruptee stations 22 may connect to other INTRQ lines of the interruptee station 22 at that station's LBC/I 34.

Devices within the interruptee station 22 which are capable of causing an interrupt in the interruptee station 22, for example the DMA peripherals 33 or the SIT 1102, are connected to yet other INTREQ lines leading to the interrupt encoder 1104. The connection is direct for devices which are capable of passing an interrupt vector to the CPU 25. The connection for devices not capable of passing an interrupt vector is indirect, by way of DEVINTREQ (device interrupt request) lines through the interrupt controller 1105, which is discussed further below.

Returning now to FIG. 7, the interrupt encoder 1104 includes a priority encoder 1114. The priority encoder 1114 is a conventional device. It has a plurality of inputs, successive pairs of which are associated with successive interrupt levels. One input of each pair of inputs represents a hardware interrupt and the other input of each pair of inputs represents a software interrupt. The INTREQ lines are connected to the hardware interrupt inputs of the priority encoder 1114. PIR output lines, one leading from each bit 1113 of the PIR 1112, are connected to the software interrupt inputs of the priority encoder 1114.

The priority encoder 1114 monitors its inputs and selects therefrom the highest level of interrupt which is currently being requested. Hardware interrupts are given priority over software interrupts. The priority encoder 1114 encodes the level and type (hardware or software) of the selected interrupt and outputs the encoded information on an IREQ (interrupt request) bus of the micrsobus 36 leading to the CPU 25 (see FIG. 4).

When the CPU 25 sees an interrupt request pending on the IREQ bus, it checks the current program execution level that it is in to determine if the interrupt is of a higher level. If the interrupt is not of a higher level, the CPU 25 does not accept the interrupt. The interrupt remains pending until the program execution level of the CPU 25 falls below the interrupt request, or until a higher level interrupt request replaces it.

If the interrupt is of a higher level, the CPU 25 accepts the interrupt. To advise the interrupt encoder 1104 of which interrupt has been accepted, and at the same time to obtain the corresponding interrupt vector, the CPU 25 performs a "read" operation substantially as was described in conjunction with FIG. 14 and the states 101-105 of FIG. 7. The CPU 25 takes from the IREQ bus the encoded information of the accepted interrupt, outputs it on the MA bus, and asserts an IACK (interrupt acknowledge) line leading back to the interrupt encoder 1104. The IACK line serves the function of the PAS Line for purposes of the interrupt.

Returning to FIG. 7, assertion of the IACK line causes the interrupt encoder 1104 to receive the information from the MA bus. From the encoded information received, a selector 1116 of the interrupt encoder 1104 determines whether the interrupt being acknowledged is a hardware or a software interrupt.

If it is a software interrupt, the selector 1116 of the interrupt encoder 1104 takes the encoded information from the MA bus and returns it to the CPU 25 on the MD bus as the interrupt vector. The interrupt encoder 1104 also asserts the DTACK line to inform the CPU 25 that it has been sent valid data on the MD bus. The interrupt handling routine pointed to by the vector may indicate to the CPU 25 who the originator of the interrupt was, and whether or not an acknowledgement of the acceptance of the interrupt need be sent to the originator. The acknowledgement, if any is needed, is done via software.

If the interrupt being acknowledged is a hardware interrupt, the selector 1116 of the interrupt encoder 1104 channels the encoded information from the MA bus to the inputs of an internal demultiplexer 1115, which is again a conventional device. The demultiplexer 1115 decodes the interrupt level. The demultiplexer 1115 has a plurality of outputs, each corresponding to a different interrupt level, and the demultiplexer 1115 asserts the output which corresponds to the decoded interrupt level. The outputs of the demultiplexer 1115 are each connected to an INTACK (interrupt acknowledge) line. The INTACK line connected at one end to any interrupt level output of the demultiplexer 1115 is connected at the other end to the same device which is connected to the INTREQ line occupying that interrupt level at the inputs of the priority encoder 1104: each INTACK line forms a line pair with an INTREQ line. Thus the assertion by the multiplexer 1115 of one of its outputs asserts the associated INTACK line and sends notification to the device which asserted the associated INTREQ line that its interrupt request has been accepted by the CPU 25.

The acknowledged device then responds to the "read" operation being performed by the CPU 25 with an interrupt vector. This procedure is somewhat complex in the case of a station 22-to-station 22 interrupt, and it is described next.

Turning to FIG. 5, any INTACK line corresponding to an INTREQ line which is connected to an LBINTRQ line is interconnected at the LBC/I 34 with the LBINTAK line which is paired with that LBINTRQ line. The INTACK lines which lead to the LBC/I 34 are also logically "OR"ed at the interrupt encoder 1104 to produce a composite signal on a LIAKSUM (local bus interrupt acknowledge sum) line (see FIG. 7) which leads to the LB/I 34.

As seen in FIG. 18, the LIAKSUM line is monitored by the LB master 38 of the interruptee station 22. The LB master 38 is responsive to the LIAKSUM line in its idle state 200, and its response to the assertion of the LIAKSUM line is to perform substantially a local bus "read" operation described above in conjunction with FIG. 18. When the LIAKSUM line is asserted, the LB master 38 makes a transition to state 208 in which it asserts the LBREQ line and awaits assertion of the LBACK line.

When the LB master 38 receives control of the local bus 21 via the LBACK signal, it goes to state 209 in which it connects the INTACK lines leading to the LBC/I 34 with the corresponding LBINTAKO lines of the local bus 21. As one of the INTACK lines is asserted, connection thereof to its corresponding LBINTAKO line causes that line to also become arrested. In the state 209 the LB master 38 also asserts the LADRSTB line.

The LBINTAK signal is daisy-chained through the stations 22 connected to the LBINTAK line, down to the interruptor station 22.

Turning now to FIG. 19, the LB slave 39 of the interruptor station 22 has been enabled by the associated interrupt slave 49 to monitor the LBINTAKI line. The LB slave 39 responds to the LBINTAKI signal by performing substantially a local bus "read" operation described above in conjunction with FIG. 19. When in the idle state 400 the LB slave 39 sees the LBINTAKI line and the LADRSTB line asserted, it responds by going to state 408 in which it asserts the LADRACK line, and awaits receipt of the LDATSTB signal.

Returning to a consideration of the interruptee station 22, it was stated above that the CPU 25 of that interruptee station 22 performs substantially a "read" operation to obtain the interrupt vector. Hence, the CPU 25 causes its associated MBC 26 to output a "read" signal on the R/W line and to assert the DS line.

As shown in FIG. 18, the LB master 38 of the interruptee station 22 responds to the assertion of the R/W, DS and LADRACK lines by going to state 210 in which it connects the MD bus of its associated station 22 with the ADDR/DATA bus of the local bus 21, outputs a "read" signal on the LBR/W line, and asserts the LDATSTB line. It then awaits the assertion of the LDATACK line.

As shown in FIG. 19, the LB slave 39 of the interruptor station 22 responds to the LDATSTB signal by going to state 409. There it causes the associated LBI 35 to interface its interrupt register 1139 (see FIG. 5) with the ADDR/DATA bus of the local bus 21 so as to place the station number and the interrupt vector contained in the register 1139 on the ADDR/DATA bus. The LB slave 39 then asserts the LDATACK line.

As the ADDR/DATA bus is interfaced to the MD bus of the interruptee station 22, the interrupt vector appears on the MD bus and the LB master 38 of FIG. 18 responds to the assertion of the LDATACK line by going to state 211 in which it asserts the DTACK line to inform the CPU 25, via the MBC 26, that the interrupt vector has been received. When the CPU 25 takes the interrupt vector from the MD bus, it causes the MBC 26 to deassert the DS line, sending the LB master 38 into state 212 in which it deasserts the DTACK and LDATSTB lines and awaits the deassertion of the LIAKSUM line.

Having received the interrupt vector, the CPU 25 also deasserts the IACK line to the interrupt encoder 1104 and removes the interrupt-acknowledging encoded information from the MA bus. Turning to FIG. 7, this causes the demultiplexer 1115 of the interrupt encoder 1104 to lose its input and hence to deassert its outputs, thus deasserting the INTACK lines. This causes the LIAKSUM line to become deasserted.

Returning to FIG. 18, the loss of the LIAKSUM signal causes the LB master 38 of the interruptee station 22 to change from the state 213 to the state 215, where it deasserts the LADRSTB and LBREQ lines, and disconnects the microbus 36 from the local bus 21, including disconnecting the INTAK lines from the LBINTAKO lines. The LB master 38 then returns to its idle state 200.

At the LB slave 39 of the interruptor station 22 shown in FIG. 19, the interruptee station's deassertion of the LBINTAK line results in the deassertion of the LDINTAKI line, causing the LB slave 39 to go to state 410 in which it deasserts the LBATACK and LADRACK lines, causes the LBI 35 to disconnect the interrupt register 1139 from the ADDR/DATA bus of the local bus 21, and asserts a CLINT (clear interrupt) line leading to the station's CSR 1106. Following a delay to allow the CLINT signal to be received at the CSR 1106, the LB slave 39 goes to state 411 in which it deasserts the CLINT line and then returns to the idle state 400.

Turning to FIG. 8, at the CSR 1106 the CLINT line is connected to a reset input of the INTERRUPT bit 1111a, and assertion of the CLINT line causes that bit to become reset. Resetting of the interrupt bit deasserts the INTRQ line leading to the LBC/I 34.

Returning to a consideration of FIG. 21, at the interrupt slave 49 of the interruptor station 22, the deassertion of the INTRQ line causes the interrupt slave 49 to go from the state 501 to state 502 wherein it disconnects the LBINTAKI line from the LB slave 39 and reconnects it to the LBINTAKO line. The interrupt slave 49 then returns to its idle state 500.

At the LBC/I 34 of the interruptor station 22, the deassertion of the INTRQ line also results in the deassertion of the LBINTRQ line to which the interruptor station 22 is connected, providing that this is the only asserted INTRQ line connected to that LBINTRQ line.

The protocol involved in a hardware interrupt thus comes to an end.

While interrupting devices, if any, within the station 22 which are capable of responding to the interrupt acknowledge, INTACK, signal by outputting an interrupt vector are directly connected to the INTREQ and INTACK lines of the interrupt encoder 1104, those not so capable of responding are interfaced to the interrupt encoder 1104 by an interrupt controller 1105 which is shown in FIG. 7. The controller 1105 may be any suitable device, for example the device AMD 9519 of Advanced Micro Devices, Inc., 901 Thompson Pl., Sunnyvale, Calif., 94086.

The controller 1105 has as inputs a plurality of DEVINTREQ (device interrupt request) lines. These lines connect to various devices in the station 22, such as the DMA peripherals 32, which may cause an interrupt of the CPU 25 of the station 22. Each DEVINTREQ line serves one device. The controller 1105 is also connected to one pair of the INTREQ and INTACK lines for connection to the interrupt encoder 1104.

When a device wishes to interrupt the CPU 25 of its stations 22, it asserts the DEVINTREQ line to which it is connected. The controller 1105 monitors the DEVINTREQ lines. In response to detecting one or more DEVINTREQ lines asserted, the controller 1105 asserts the INTRREQ line leading to the interrupt encoder 1104. The controller 1105 also prioritizes the interrupt requests pending on the DEVINTREQ lines.

The controller 1105 includes a RAM 1120 which contains an interrupt vector for each device connected to the controller's DEVINTREQ lines. The interrupt vectors are written into the RAM 1120 under software control. For this purpose the interrupt controller is connected to the MA and MD bases and the PAS, DS, R/W, and DTACK lines of the microbus 36.

When the encoder 1104 asserts the INTACK (interrupt acknowledge) line leading back to the controller 1105, the controller 1105 treats the interrupt acknowledgement as acknowledgement of the highest priority pending interrupt. In response to the INTACK signal, the controller 1105 outputs the interrupt vector of the device whose interrupt request is being acknowledged from the RAM 1120 onto the MD bus, for use by the CPU 25, and asserts the DTACK line to advise the CPU 25 thereof as part of the interrupt vector "read" protocol mentioned above.

While only one interrupt controller 1105 is shown in FIG. 7, more than one can be utilized in the station 22 and connected to other INTREQ/INTACK line pairs. Interrupt controllers other than the one interrupt controller 1105 may be considered to be part of the application circuitry and peripherals 1107.

Aside from the functions already described that are supported and distributed throughout the multiprocessor system 20, three others merit discussion here: RESET, DIAGNOSE, and BOOT.

The RESET function causes resettable devices in the multiprocessor system 20 to reset, to initialize. The RESET function is implemented in the multiprocessor system 20 by means of a RESET (local bus reset) line of the local bus 21. The RESET line is initially asserted in response to power being turned on in the system 20. The function of monitoring the system power and of performing other generic power control functions may be performed in the system 20 by a station 22 dedicated to that function. Alternatively, the power control functions may be performed by a portion of the application circuitry and peripherals 1107 of a station 22 such as the CC 22a. In any case, the station 22 charged with power control functions monitors power in the system 20 and when it observes power going from off to on in the system 20, it asserts for a predetermined period of time the LRESET line of the local bus 21.

The LRESET line leads to every station 22 in the system 20. As seen in FIG. 5, at the LBC/I 34 of every station 22 the LRESET line is connected to a RESET line which leads to a RESET bit 1111e of the CSR 1106. (See FIG. 8). Assertion of the RESET line sets the RESET bit 1111e. The RESET bit 1111e is in turn connected to a RESREQ (reset request) output line which leads to a reset sequencer 148 of the MBC 26 (see FIG. 4). The setting of the RESET bit 1111e in turn asserts the RESREQ line. The reset sequencer 148 of the MBC 26 observes the assertion of the RESREQ line, and after a predetermined delay it responds thereto by asserting a SYSRES (system reset) line.

The SYSRES line is connected to all resettable devices in the station 22, including the MBC 26 itself and to the CPU 25, as shown in FIG. 4, the DMA peripherals 33 and the LBC/I 34, as shown in FIG. 5, the SIT 1102, as shown in FIG. 6, the application circuitry and peripherals 1107, the interrupt controller 1105 and the interrupt encoder 1104, as shown in FIG. 7, and the CSR 1106, as shown in FIG. 8. Assertion of the SYSRES line causes the resettable devices to become initialized. As shown in FIGS. 17 through 21 for the devices 26, 38, 39, 47, respectively, assertion of the SYSRES line forces these devices into the IDLE state irrespective of which other state they may be in at that time. At the CSR 1106 the assertion of the SYSRES line clears the RESET bit 1111e, causing the deassertion of the RESREQ line, which in turn causes the SYSRES line to become deasserted.

As the bits 1111 of the CSR 1106 of a station 22 can be set via software, another station 22, or a device of the station 22 itself, can cause the station 22 to reset by accessing and setting its RESET bit 1111e. Thus any resettable station 22 can be selectively reset from anywhere in the multiprocessor system 20.

The CSR 1106 of the station 22, for example, the central controller 22a, may also include a RESALL (reset all) bit 1111f whose output is connected via a sequencer 1212 to the RESET line of the station 22, and therethrough to the LRESET line of the local bus 21. The RESET lines of all stations 22 of the system 20 are connected to the LRESET line in parallel, and assertion of any one RESET line asserts the LRESET line. Thus the CPU 25 of the stations 22, or of any other station 22, is given the capability of resetting all stations 22 of the the multiprocessor system 20, including itself, by accessing, under software control, and setting the RESALL bit 1111f of the CSR 1106. The output of the set RESALL bit 1111f causes the sequencer 1212 to assert the RESET line and to hold it asserted for a predetermined period of time, thus asserting the LRESET line for the predetermined period of time, causing the multiprocessor system 20 to become reset in the manner described above.

Alternatively, the output of the RESALL bit may be connected by a dedicated line (not shown) to the station 22 which is charged with the power control functions of the system 20 to cause that station 22 to assert the LRESET line.

The DIAGNOSE function causes intelligent stations 22 to diagnose themselves by causing their CPUs 25 to execute the diagnostic programs stored in the diagnostic module 1110 of their ROMs 1100 (see FIG. 6). It also causes the intelligent station or stations 22 charged with this function to diagnose the passive stations 22 by accessing the diagnostic modules 1110 of those passive stations 22 and executing for them the diagnostic programs stored therein.

The DIAGNOSE function is distributed throughout the system 20 in accompaniment with the RESET function. An LDGN (local bus diagnose) line parallels the LRESET line, and the DIAGNOSE command is always accompanied by the RESET command. The LDGN line is selectively asserted for a predetermined period of time by the station 22 which asserts the LRESET line. Like the LRESET line, the LDGN line leads to every station 22 in the system 20. Referring to FIG. 5, at the LBC/I 34 of every station 22 the LDGN line is connected to a DIAGN line which leads to a DIAGNOSE bit 1111h of the CSR 1106 (see FIG. 8). Assertion of the DIAGN line sets the DIAGNOSE bit 1111h.

Assertion of the LDGN line always extends in time beyond the deassertion of the LRESET line, for the purpose of assuring that the DIAGNOSE bit 1111h remains set following the resetting of devices, including the CSR 1106, of a station 22.

As a part of the initialization procedure upon reset, the CPU 25 of the station 22 is caused to check the state of the DIAGNOSE bit 1111h. If the bit 1111h is set, the CPU 25 executes the diagnostic programs of the diagnostic module 1110. If the execution of that program finds no faults in the station 22, the CPU 25 is caused, under diagnostic software control, to clear the DIAGNOSE bit 1111h.

The output of the DIAGNOSE bit 1111h is connected to the EN (enables) input of the driver 1133 of the LED 1134. When the DIAGNOSE bit is set, the driver 1133 is enabled and drives the LED 1134, turning it on. The driver 1133 is disabled otherwise and the LED 1134 is turned off. Thus the turning on of the LED 1134 gives an optical indication of the performance of diagnostics in the station 22. The failure of the LED 1134 to turn off after some period of time gives an optical indication of the failure of the station 22 to pass diagnostics.

The output of the DIAGNOSE bit 1111h is also connected to a DGNFAIL (diagnostic failure) line. The DGNFAIL line is asserted while the DIAGNOSE bit 1111h is set. The DGNFAIL line leads to the LBC/I 34, and there it connects, in parallel with the DGNFAIL lines of all other stations 22 of the system 20, to a LDGNFAIL (local bus diagnostic failure) line (see FIG. 5). The LDGNFAIL line is asserted by the assertion of any one DGNFAIL line. The LDGNFAIL line leads to the central controller 22a, or alternatively to a maintenance processor station 22, (not shown), if one is included in the system 20, which monitors the LDGNFAIL line to determine it any station 22 has failed diagnostics. If the LDGNFAIL line remains asserted for some predetermined period of time after the LRESET line was deasserted, presence of a diagnostic failure within the system 20 is indicated.

As the bits 1111 of the CSR 1106 of a station 22 can be set via software, another station 22, or a device of the station 22 itself, can cause the station 22 to become diagnosed by accessing and setting its RESET bit 1111e and its DIAGNOSE bit 1111h. Thus any station 22 can be forced to become diagnosed from anywhere in the multiprocessor system 20.

Returning to FIG. 8, the CSR 1106 of the station 22, again for example, the central controller 22a, may also include a DGNALL (diagnose all) bit 1111g whose output is connected, via a sequencer 1213, to the DIAGN line of the station 22, and therethrough to the LDGN line of the local bus 21. The DIAGN lines of all stations 22 of the system 20 are connected to the LDGN line in parallel, and assertion of any one DIAGN line asserts the LDGN line. Thus the CPU 25 of the station 22, or of any other station 22, is given the capability of causing all stations 22 within the system 20 to become diagnosed by accessing, under software control, and setting the DGNALL bit 1111g of the CSR 1106.

The output of the set DGNALL bit 1111g causes the sequencer 1213 to assert the DIAGN line, and therethrough the LDGN line. The sequencer 1213 monitors the RESET output of the sequencer 1212 and causes the DIAGN line to be asserted for a predetermined period of time longer than the RESET line is asserted, to assure that the LDGN line will be asserted after the LRESET line becomes deasserted. The assertion of the LRESET line causes the DIAGNOSE bits 1111h of all stations 22 to become set and thus causes the stations 22 to become diagnosed, in the manner described above.

BOOT is a function which causes a station 22 to acquire the capability of bringing into operation the software operating system of the multiprocessor system 20. Unlike the RESET and DIAGN functions just described, the BOOT functions is initiated via software. BOOT is a program routine which causes the input into a station 22 from a storage device of an initial program that brings up, starts running, the software operating system (OS) of the multiprocessor 20. Bootstraps loading routines and OS starting programs are known to the art.

The BOOT routine is stored in the ROM 1100 of those intelligent stations 22 which have access to the storage devices that store the OS starting program. An application-dependent bit 1113 of the PIR 1112 of the interrupt encoder 1104 of each of these stations is dedicated to the BOOT function. The setting of the PIR bit 1113 dedicated to the BOOT function causes an interrupt in the station 22 which causes the CPU 25 of the station 22 to execute the BOOT routine. As the PIR 1112 is addressable from any station 22 within the system 20, any station 22 may cause the multiprocessor system 20 to be BOOTed. The BOOT routine is generally caused to be executed as part of the RESET or DIAGNOSE function.

While the discussion of FIGS. 4 through 21 proceeded in the context of a stand-alone system 20, the concepts and implementation described in that discussion are directly extendable to the multicomputer system 17, and are within the skill of the art. For purposes of extending the concepts and implementation of the multiprocessor system 20 to the multicomputer system 17, the multicomputer system 17 may be thought of as merely being a multiprocessor system of a higher hierarchy, such that the system bus 18 has the functionality of a local bus 21, each system 20 assumes the functionality, from the viewpoint of the system bus 18, of a station 22, and each system bus interface 19 includes the functionality of an LBC/I 34. In order to implement passive access and deadlock resolution on a multicomputer system 17 level, the LBC/I 34 of each intelligent station 22 is expanded to include buffers akin to the buffers 28–30 (see FIG. 5), and the related functionality of the MBC 26, such that the LBC/I 34 has the capability of disconnecting the station 22 from the local bus 21 of its multiprocessor system 20 anytime the station 22 is attempting to access the system bus 18 while a station 22 of another multiprocessor system 20 is in control of the system bus 18 and is trying to access the local bus 20 of the former multiprocessor system 20.

Of course, its should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

What is claimed is:

1. In a data processing, communication, or telephone system, a multiprocessor comprising:
   a plurality of identifiable stations each having a first plurality and a second plurality of addresses associated therewith, the addresses of the second plurality of addresses being common to all stations, and the addresses of the first plurality of addresses of each station being exclusive to that station and including addresses of the second plurality of addresses each combined with an address portion identifying the associated station;

each station including a plurality of addressable elements, each element having associated therewith a second address from the second plurality of addresses and a first address from the first plurality of addresses such that the first address is the second address combined with the address portion identifying the station;

the plurality of elements of each station including a plurality of elements that are common among stations in that for each common element there is another element in at least one other station that is a functional counterpart of the common element, each common element and its counterpart elements having the same second address associated with them;

a system communication bus interconnecting the plurality of stations;

each station including a station communication bus interconnecting the plurality of elements of the associated station;

at least two of the plurality of stations each having processor means connected to the station bus, the processor means for generating the first address of an element of another station on the station bus to access the addressed element of the other station, and further for generating the second address of an element of the associated station on the station bus to access the addressed element of the associated station;

each of the at least two stations having first interface means for connecting the system bus with the station bus in response to detecting an address from a first plurality of addresses on the station bus, to transfer the address to the system bus; and each station having second interface means for connecting the system bus with the station bus in response to detecting an address from the first plurality of addresses of the associated station on the system bus, to transfer the second address portion of the first address from the system bus to the station bus.

2. The system of claim 1 wherein each of the at least two stations further includes means for preventing the processor means of the associated station from accessing elements in response to the presence of an address from the first plurality of addresses of the associated station on the system bus.

3. The system of claim 1 wherein each of the at least two stations further includes means for preventing the processor means of the associated station from accessing elements in response to accessing of an element of the associated station over the system bus.

4. The system of claim 3 wherein the preventing means further allow the processor means of the associated station to access elements when an element of the associated station is not being accessed over the system bus.

5. They system of claim 1 wherein each of the at least two stations further include means for disconnecting the processor means from the station bus in response to detecting an address from the first plurality of addresses of the associated station on the system bus.

6. The system of claim 1 wherein the elements of each station include means, responsive to being selectively accessed, for inhibiting the second interface means from connecting the system bus with the station bus.

7. The system of claim 1 wherein each of the at least two stations further includes means for detecting accessing of an element of the associated station over the system bus while the associated processor means of the associated station are accessing an element; and means, responsive to the detecting means, for pausing the access by the associated processor means of the element and for continuing the access by the associated processor means of the element when accessing over the system bus of the element of the associated station ceases to be detected.

8. The system of claim 1 wherein each station further includes means responsive to detecting an address from the first plurality of addresses of the associated station on the system bus for generating an acknowledgement signal on the system bus, and wherein each of the at least two stations further includes access control means responsive to detecting on the system bus an acknowledgement signal, generated in response to generation by the associated processor of the acknowledged address, for enabling the associated processor means to continue accessing.

9. The system of claim 1 wherein each of the at least two stations includes means responsive to being accessed for interrupting that station's processor means.

10. The system of claim 1 wherein at least one station includes means for generating a signal for halting operations on the system bus, and wherein each of the at least two stations includes means responsive to detecting the signal for halting that station's processor means.

11. The system of claim 1 wherein at least one station includes means for generating a signal for halting operations on the system bus and wherein each station includes at least one element that changes its operational states, and means responsive to detecting the signal for stopping the at least one element from changing its current state.

12. The system of claim 1 wherein each station includes at least one element that changes its operational state from one to another of a plurality of states including a first state, means for generating a reset signal on the system bus, and reset means responsive to detecting the reset signal for forcing the at least one element to change its operational state to the first state, the reset means further responsive to being accessed for forcing the at least one element to change its operational state to the first state.

13. The system of claim 1 wherein each station includes diagnostic memory means for storing a program for diagnosing the station, means for generating a signal on the system bus, and means responsive to detecting the signal for causing a processor means to execute the diagnostic program of the station, the means further responsive to being accessed for causing the processor means to execute the diagnostic program of the station.

14. The system of claim 13 wherein the diagnostic memory means are removably connected to the stations.

15. The system of claim 1 wherein at least one of the at least two stations includes storage means for storing a boot program for booting the system and means responsive to being accessed for causing the associated processor means to execute the boot program.

16. The system of claim 1 wherein each station includes storage means for storing information identifying the station, the storage means of all stations being for access by a processor to determine the configuration of the system.

17. In a data processing, communication, or telephone system, a multiprocessor comprising:

a plurality of identifiable stations each having a first plurality and a second plurality of addresses associated therewith, the addresses of the second plurality of addresses being common to all stations, and the addresses of the first plurality of addresses of each station being exclusive to that station and including addresses of the second plurality of addresses each combined with an address portion identifying the associated station;

each station including a plurality of addressable elements, each element having associated therewith a second address from the second plurality of addresses and a first address from the first plurality of addresses such that the first address is the second address combined with the address portion identifying the station;

the plurality of elements of each station including a plurality of elements that are common among stations in that for each common element there is another element in at least one other station that is a functional counterpart of the common element, each common element and its counterpart elements having the same second address associated with them;

a system communication bus interconnecting the plurality of stations;

each station including a station communication bus interconnecting the plurality of elements of the associated station;

at least two of the plurality of stations each having processor means connected to the station bus, the processor means for generating the first address of an element of another station on the station bus to access the addressed element of the other station, and further for generating the second address of an element of the associated station on the station bus to access the addressed element of the associated station;

each of the at least two stations having first interface means for connecting the system bus with the station bus in response to detecting an address from a first plurality of addresses on the station bus, to transfer the address to the system bus;

each station having means for converting an address of the first plurality of addresses into the included address of the second plurality of addresses;

each station having second interface means for connecting the system bus through the address converting means to the station bus in response to detecting an address from the first plurality of addresses of the associated station on the system bus, to transfer the second address portion of the first address from the system bus to the station bus;

each station having means responsive to detecting an address from the first plurality of addresses of the associated station on the system bus for generating on the system bus a first signal acknowledging the address;

each of the at least two stations having access control means responsive to detecting on the system bus a first signal generated in response to an acknowledged address generated by its associated processor means for allowing the processor means to continue accessing the addressed element; and each of the at least two stations having means responsive to detecting an address from the first plurality of addresses of the associated station on the system bus, for disconnecting the associated processor from the station bus.

* * * * *